United States Patent
Kamishita et al.

[11] Patent Number: 6,104,880
[45] Date of Patent: Aug. 15, 2000

[54] LENS DRIVING CONTROLLER

[75] Inventors: Hironori Kamishita, Osaka; Hiroshi Ueda, Habikino; Yoshiharu Tanaka, Kawachinagano; Junichi Tanii, Izumi, all of Japan

[73] Assignee: Minolta Co., Ltd., Osaka, Japan

[21] Appl. No.: 09/328,789

[22] Filed: Jun. 9, 1999

[30] Foreign Application Priority Data

Jun. 10, 1998 [JP] Japan ................................. 10-161958

[51] Int. Cl.$^7$ ................................................ G03B 13/34
[52] U.S. Cl. ............................................................ 396/133
[58] Field of Search .................................. 396/133, 135, 396/136

[56] References Cited

U.S. PATENT DOCUMENTS

| | | | |
|---|---|---|---|
| 4,509,842 | 4/1985 | Taniguchi et al. | 396/81 |
| 4,894,676 | 1/1990 | Ohnuki et al. | 396/135 |
| 5,057,859 | 10/1991 | Ishimaru | 396/135 X |
| 5,239,331 | 8/1993 | Kobe et al. | 396/135 |
| 5,887,201 | 3/1999 | Maeno | 396/135 X |

FOREIGN PATENT DOCUMENTS 59-26709  2/1984  Japan .

Primary Examiner—W. B. Perkey
Attorney, Agent, or Firm—Burns, Doane, Swecker & Mathis, LLP

[57] ABSTRACT

A lens driving controller has a driving mechanism for driving a lens along an optical axis, a calculator for obtaining a lens driving amount to an in-focus position, and a detector for detecting a position of the lens. The controller drives the lens in an in-focus direction in accordance with a lens driving amount obtained by the calculator, drives the lens in an opposite direction when the lens reaches a first lens position where a remaining driving amount to the in-focus position is a predetermined value, obtains information on a second lens position when the lens actually starts to move in the opposite direction, obtains a lens movement amount from the first lens position and the second lens position and performs remaining driving to the in-focus position and stop control based on an obtained lens movement amount.

22 Claims, 21 Drawing Sheets

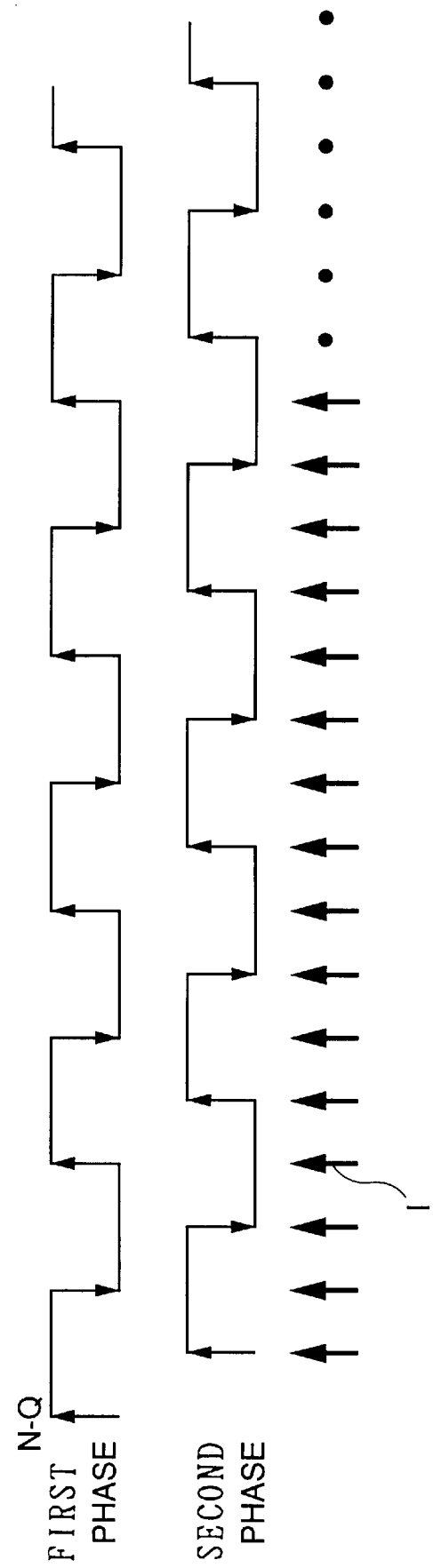

LENS DRIVING CONTROLLER

This application is based on application No. H10-161958 filed in Japan, the contents of which are hereby incorporated by reference.

BACKGROUND OF THE INVENTION

1. Field of the Invention

The present invention relates to driving control of a lens attached to a camera.

2. Description of the Prior Art

Conventionally, single-lens reflex (SLR) systems of cameras have been premised on the use of various types of interchangeable lenses, and in-focus photos cannot be obtained unless the lens is stopped at the in-focus position with accuracy in any types of interchangeable lenses in automatic focusing. However, stopping or damping characteristics of interchangeable lenses vary widely, and automatic focusing cannot accurately be performed with a response of the shortest time unless the stop control is performed in consideration of the damping characteristic of each lens.

The stop control can be performed by providing a control parameter associated with the damping characteristic of each type of interchangeable lenses. However, it cannot be said that this is a desirable countermeasure, because it is predicted that various types of interchangeable lenses will be put on the market in the future and it is considered that lens data will increase accordingly. According to a conventional method, of various types of interchangeable lenses, a lens that is poorest in damping characteristic and most disadvantageous in the stop control is selected, a control parameter is decided so that this lens can accurately be stopped in the shortest time, and the control parameter is also applied to other interchangeable lenses.

FIG. 1 is a graph showing the conventional camera lens stop control method. Here, the lateral axis represents the drive time t, and the longitudinal axis represents the number of revolutions rps of the drive motor. As shown in the figure, in the lens driving control, typically, the motor is activated with full energization at a point $p_1$, and the lens movement speed becomes constant at a point $p_2$ and starts to be reduced at a point $p_3$. The point $p_3$ is the first speed reduction point decided so that the lens that is poorest in damping characteristic and most disadvantageous in the stop control, that is, the lens whose driving amount from the application of the brake to the complete stop is largest is accurately stopped.

Therefore, as shown in the figure, the lens being most disadvantageous in the stop control is slowed at "a" fixed rate as shown by the line A, and at a point a, in-focus condition is obtained in the shortest time for the lens and the lens is stopped. The actual driving amount is represented by the area surrounded by the lines of the graph (in this example, the lines connecting the points $p_1$, $p_2$, $p_3$ and "a") and the lateral axis, that is, the integration value of the graph.

However, according to the conventional lens stop control method, since the first speed reduction point is decided so that the lens being most disadvantageous in the stop control is accurately stopped as mentioned above, when a lens having a different damping characteristic is stop-controlled, for example, the speed reduction of the lens is represented by a curve as shown by the line B of FIG. 1. In this case, since the damping characteristic is comparatively excellent, the time required for the lens movement speed to be reduced to a predetermined speed is shorter accordingly and the driving amount is smaller, so that if the speed reduction is performed as it is, the lens movement speed is reduced as shown by the line C and the lens is stopped at a point "c" before in-focus condition is obtained. Therefore, in order for the lens to be stopped at the in-focus position, the lens is moved at constant speed in the ranges shown by "s" in the figure.

In-focus condition is obtained at point "b" of the figure and the lens is stopped. However, as is apparent from comparison with the point "a", the control time can be longer than that in the case of the lens being most disadvantageous in the stop control. When the stop control is performed by appropriately delaying the speed reduction point to make the most of the damping characteristic intrinsic to this lens, it should be possible to perform the stop control in a shorter time without being affected by the stop control time of the lens being inferior in damping characteristic.

FIG. 2 is a graph showing a stop control method to be carried out. Here, like in FIG. 1, the lateral axis represents the drive time t, and the longitudinal axis represents the number of revolutions rps of the drive motor. As shown in the figure, when at a speed reduction point $p_4$ delayed from the speed reduction point $p_3$ of the lens being most disadvantageous in the stop control, the speed reduction control of a corresponding lens being comparatively excellent in damping characteristic is started, the lens is slowed at a fixed rate as shown by the broken line D, and at a point "d", in-focus condition is obtained in the shortest time for the lens and the lens is stopped. At this time, the time from the activation to the stop is t1 represented by a dimension line, and compared to the time t2 (also represented by a dimension line) from the activation to the stop by the above-described conventional stop control method, the control time decreases by t2−t1.

Thus, to set the most suitable speed reduction point, the stop control can be performed by providing a control parameter associated with the damping characteristic of each type of interchangeable lenses as mentioned in the prior art. However, since there are cases where the same type of interchangeable lenses have different damping characteristics because of nonuniformness among the interchangeable lenses, it cannot be said that this method is a good solution. Further, it is necessary to increase the memory capacity of the camera in accordance with the increase in data due to increase in types of interchangeable lenses.

This problem can be solved by measuring the actual damping characteristic when each interchangeable lens is attached to the camera, and capitalizing on the data to perform the stop control. However, to determine that the lens is actually stopped after the application of the brake in measuring the damping characteristic, it is necessary to wait for a predetermined time to make sure that the lens is not moving. This increases the control time.

SUMMARY OF THE INVENTION

An object of the present invention is to provide a camera lens driving controller or a camera in which the stop control time can be reduced by measuring the damping characteristic of each interchangeable lens in a minimum time and performing the stop control of each lens based on the data without the provision of a control parameter for each type of lenses or each lens.

To achieve the above-mentioned object, a lens driving controller or a camera according to one aspect of the present invention is provided with:

a driving mechanism for driving a lens along an optical axis;

a calculator for obtaining a lens driving amount to an in-focus position; and a detector for detecting a position of the lens.

The following lens driving control is performed under control of a predetermined controller:

(1) the lens is driven in an in-focus direction in accordance with a lens driving amount obtained by the calculator;

(2) the lens is driven in an opposite direction when the lens reaches a first lens position where a remaining driving amount to the in-focus position is a predetermined value;

(3) information on a second lens position when the lens actually starts to move in the opposite direction is obtained;

(4) a lens movement amount is obtained from the first lens position and the second lens position; and (5) remaining driving to the in-focus position and stop control are performed based on an obtained lens movement amount.

BRIEF DESCRIPTION OF THE DRAWINGS

This and other objects and features of this invention will become clear from the following description, taken in conjunction with the preferred embodiments with reference to the accompanying drawings in which:

FIG. 12 is a schematic view showing an example of occurrence timing of the pulse edge interrupt;

DESCRIPTION OF THE PREFERRED EMBODIMENTS

Figure 1:
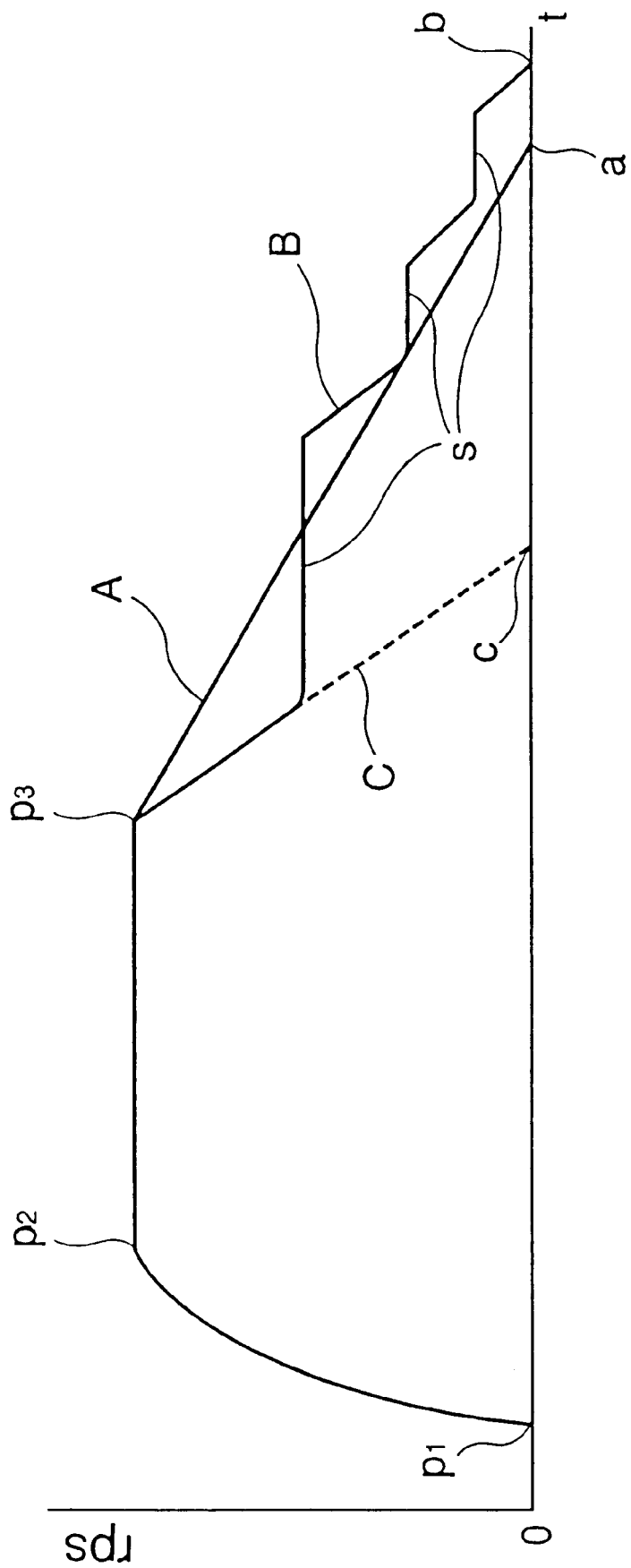
FIG. 1 is a graph showing the conventional lens stop control method.
Figure 2:
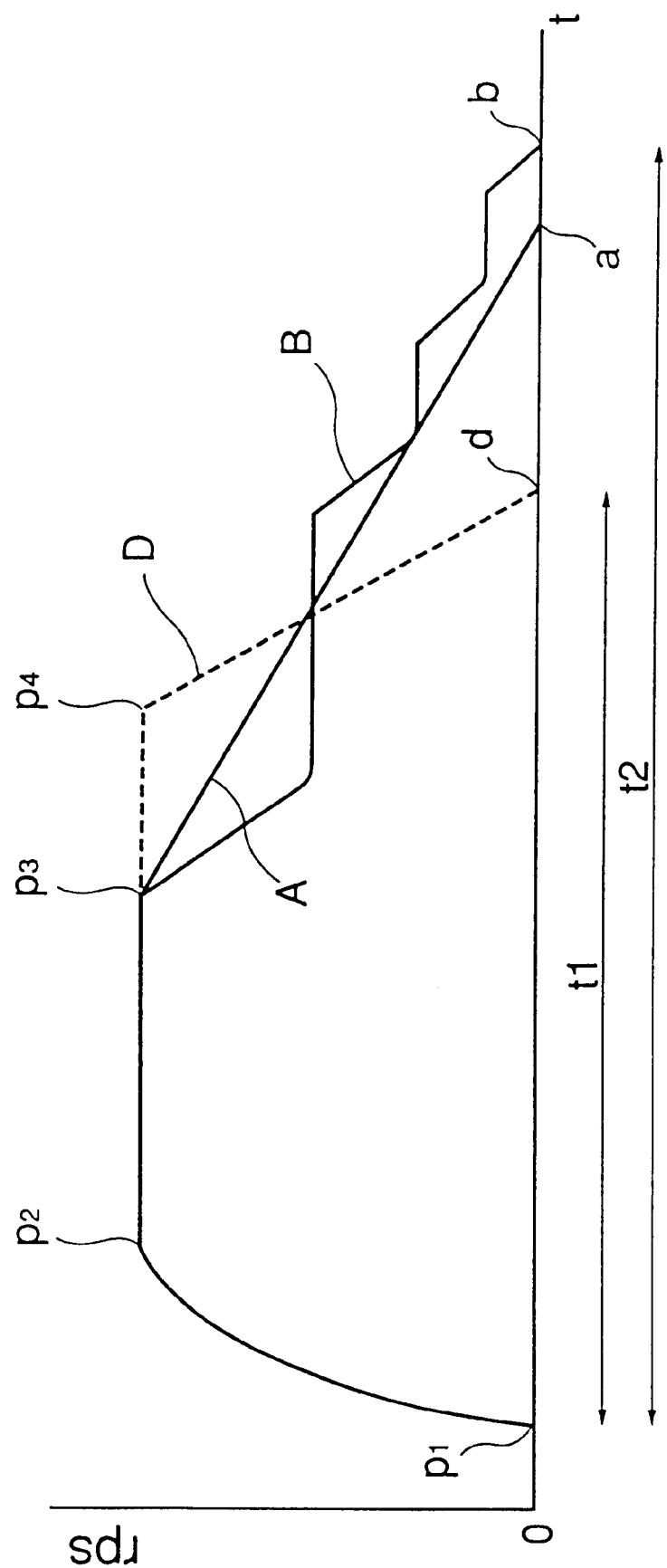
FIG. 2 is a graph showing the stop control method to be carried out.
Figure 3:
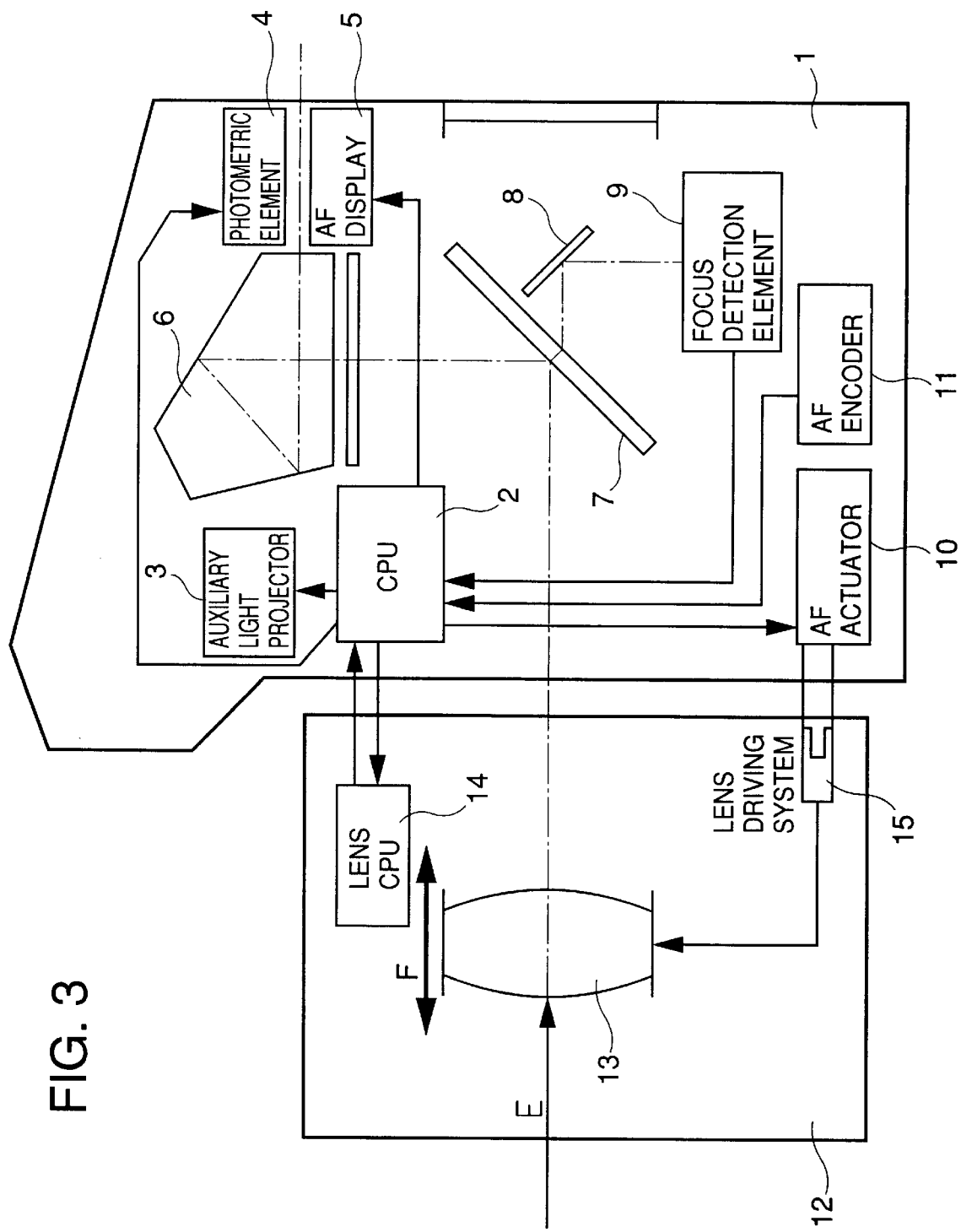
FIG. 3 is a longitudinal cross-sectional view schematically showing the basic structure of a single-lens reflex camera.

Hereinafter, embodiments of the present invention will be described with reference to the drawings. FIG. 3 is a longitudinal cross-sectional view schematically showing the basic structure of a single-lens reflex camera, as one embodiment of the present invention. In the figure, reference numeral 1 represents a camera body. The element 2 disposed inside the camera body 1 is a CPU comprising, for example, a microcomputer. Reference numeral 3 represents an auxiliary light projector for focus detection. Reference numeral 4 represents a photometric element for exposure. Reference numeral 5 represents an automatic focusing display. Reference numeral 6 represents a finder pentagonal roof prism. Reference numeral 7 represents a movable mirror which flips up at the time of photographing. Reference numeral 8 represents a totally reflecting mirror. Reference numeral 9 represents a focus detection element. Reference numeral 10 represents an AF actuator comprising a motor or the like. Reference numeral 11 represents an AF encoder of a two-phase output type.

Reference numeral 12 represents an interchangeable lens attached to the camera. The element 13 disposed in the interchangeable lens 12 is a taking lens. Reference numeral 14 represents a lens CPU comprising, for example, a microcomputer. The lens CPU 14 transmits the type and the characteristics of the interchangeable lens 12 being attached to the camera body 1 as digital information. Reference numeral 15 represents a lens driving system for transmitting the driving force from the AF actuator 10 to the taking lens 13. In FIG. 3, the photographic light from a non-illustrated subject which light is incident on the interchangeable lens 12 from the direction of the arrow E is transmitted by the taking lens 13, and part of the light is transmitted by a half mirror portion of the movable mirror 7 and is directed by the totally reflecting mirror 8 to be incident on the focus detection element 9.

The focus detection element 9 measures the focus shift with respect to the subject by the light, and transmits the information to the CPU 2. The CPU 2 drives the AF actuator 10 based on the information. The driving force is transmitted from the lens driving system 15 to the taking lens 13, so that the taking lens 13 is driven as shown by the arrow F. The amount of driving by the AF actuator 10 is detected by the AF encoder 11 and fed back to the CPU 2.

Figure 4:
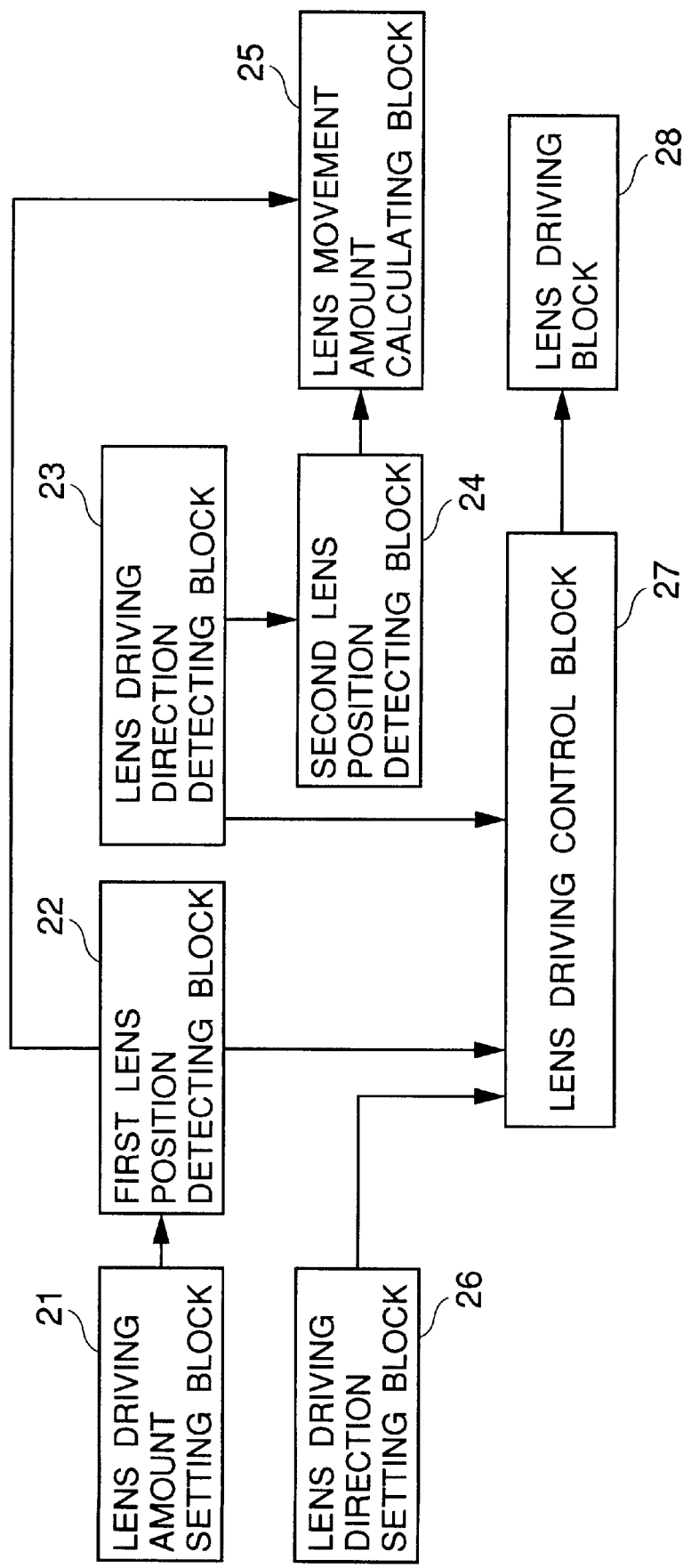
FIG. 4 is a block diagram virtually showing the function of a control system in a first embodiment of the present invention by dividing the function into function units.
Figure 5:
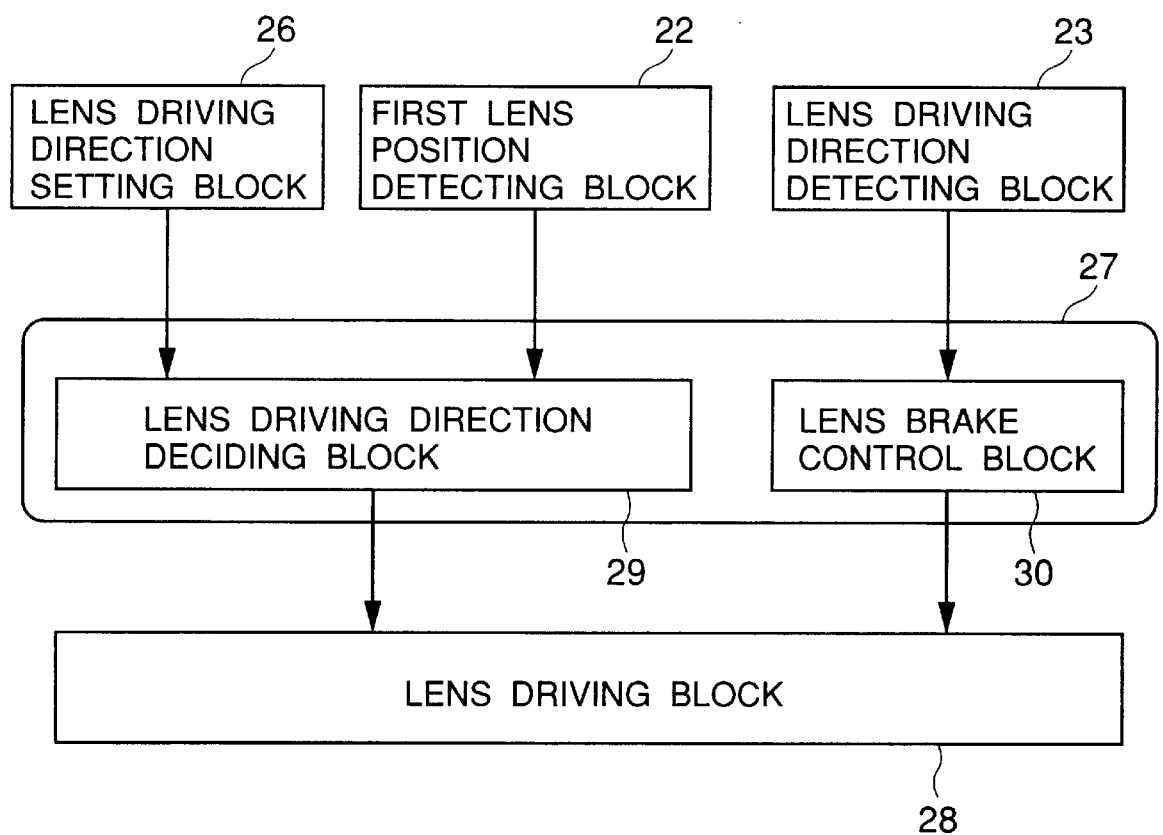
FIG. 5 is a block diagram showing the relationship between a lens driving control block and other blocks.

FIGS. 4 and 5 are block diagrams schematically showing the function of a control system in a first embodiment of the present invention by dividing the function into function units. As shown in FIG. 4, first, receiving information on the focus shift direction and the shift amount, a lens driving amount setting block 21 sets the total driving amount of the taking lens 13. Then, a first lens position detecting block 22 detects the position of the taking lens 13 when the remaining driving amount to the in-focus point becomes a predetermined value. The predetermined value comes from a speed reduction point set based on the damping characteristic of the lens as described later. The information at this time is output to a lens movement amount calculating block 25 and a lens driving control block 27.

A lens driving direction detecting block 23 detects by use of a second lens position detecting block 24 the position where the taking lens 13 starts to move in the opposite direction. This is done for quickly and reliably detecting that the taking lens 13 completely stops after the stop control is started by oppositely energizing the AF actuator 10 at the point of time when the taking lens 13 reaches the first lens position. The information at this time is output to the lens movement amount calculating block 25 and the lens driving control block 27.

A lens driving direction setting block 26 sets the driving direction for directing the taking lens 13 to the in-focus position. This information is output to the lens driving control block 27. Lastly, the lens driving control block 27 controls a lens driving block 28 based on these pieces of information. The lens movement amount calculating block 25 calculates the movement amount from the first lens position to the second lens position. Based on this, the predetermined value for the next driving is decided.

The above-mentioned blocks are described for convenience of explanation and do not necessarily correspond to actual parts. In actuality, a function represented as a single block includes one that is achieved by a plurality of parts operating in conjunction with one another or includes a single part that achieves functions of a plurality of blocks. For example, the workings of the lens driving amount setting block 21, the lens driving direction detecting block 23, the lens movement amount calculating block 25, the lens driving direction setting block 26 and the lens driving control block 27 include at least part of a function achieved by the CPU 2. The workings of the first lens position detecting block 22 and the second lens position detecting block 24 include a function achieved by the AF encoder 11. The working of the lens driving block 28 includes functions achieved by the AF actuator 10 and the lens driving system 15.

As shown in FIG. 5, the lens driving control block 27 and other control blocks are functionally connected therebetween. A lens driving direction deciding block 29 provided in the lens driving control block 27 shown in the figure decides the driving direction of the taking lens 13 so as to be the in-focus direction based on the output of the lens driving direction setting block 26 at the time of start of the driving, and when the output of the first lens position detecting block 22 comes, the lens driving direction deciding block 29 decides the driving direction so as to be opposite to the direction having been decided (opposite energization).

A lens brake control block 30 provided in the lens driving control block 27 produces an output to prevent the motor from rotating in the opposite direction by applying the brake when the lens movement direction is reversed, based on the output of the lens driving direction detecting block 23. The method of applying the brake includes stopping the energization of the AF actuator 10 and short-circuiting the AF actuator 10. The lens driving block 28 is controlled based on these pieces of information.

The blocks of FIG. 5 are also described for convenience of explanation and do not necessarily correspond to actual parts.

Figure 6:
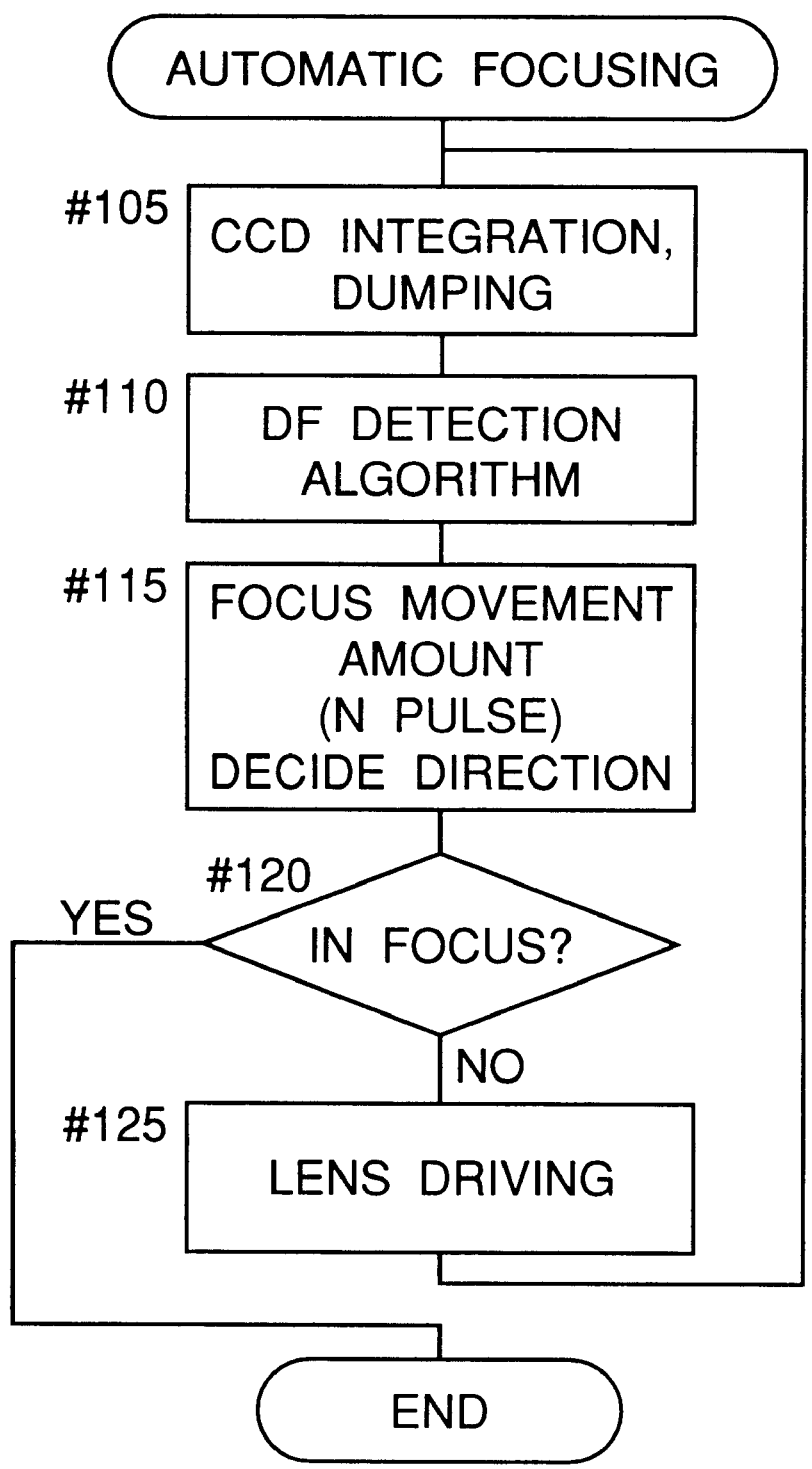
FIG. 6 is a flowchart showing a routine of automatic focusing control.

A concrete control in this embodiment will hereinafter be described with reference to flowcharts. FIG. 6 is a flowchart showing a routine of automatic focusing control. In the figure, at step #105, CCD integration by the phase difference detection method is performed by the focus detection element 9, and the obtained data are dumped. Then, at step #110, as a defocus detection algorithm, a correlation calculation is performed to detect a defocus amount.

Then, at step #115, the defocus amount is converted into a pulse count N of the AF encoder 11 as the focusing movement amount to decide the movement direction. Then, at step #120, whether in-focus condition is obtained or not is determined. When in-focus condition is not obtained, the process shift to step #125 to perform lens driving. Then, the process returns to step #105. When in-focus condition is obtained at step #120, the automatic focusing control is ended.

Figure 7:
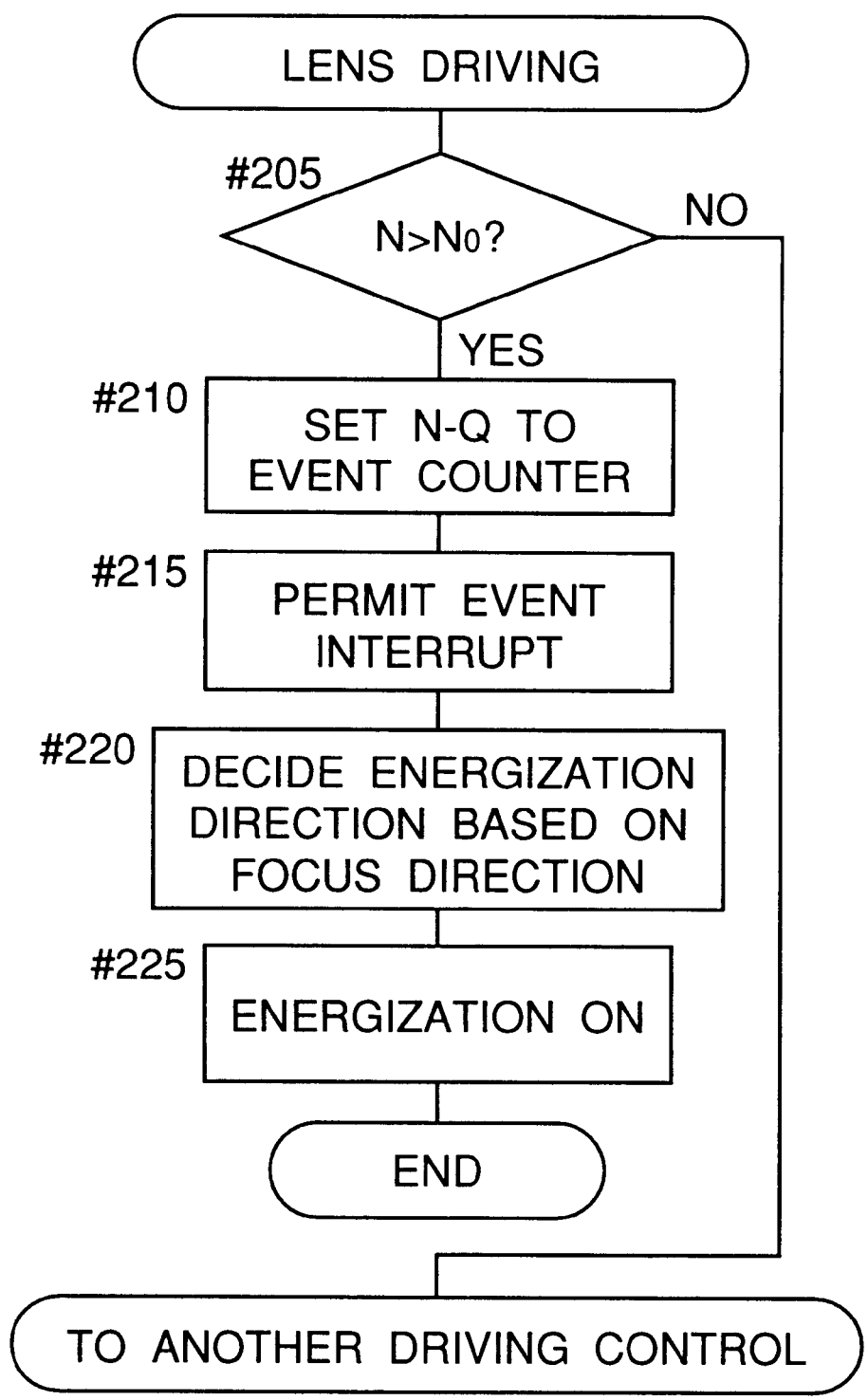
FIG. 7 is a flowchart showing a routine of lens driving control.

FIG. 7 is a flowchart showing a routine of the lens driving control at step #125 of the automatic focusing control routine. In the figure, first, at step #205, it is determined whether the pulse count N which is the present focusing movement amount is greater than a reference pulse count $N_0$ or not. When it is greater, the process shifts to step #210. The reference pulse count $N_0$ is preset in consideration of the focusing movement amount suitable for performing a dynamic lens driving control like that in this embodiment.

At step #205, when the pulse count N is not greater than the reference pulse count $N_0$, since it is unnecessary to perform the lens driving control like that in this embodiment, for example, a control such that the lens is moved to the in-focus point at a low speed at a fixed pulse rate is performed as another driving control.

At step #210, N–Q is set to an event counter. Here, Q represents the pulse count when the lens is driven from the first lens position to the second lens position which pulse count is obtained in the previous driving control. By setting N–Q, the present first lens position, that is, the position where the stop control is started by oppositely energizing the AF actuator 10 is decided. However, when the present driving control is the first driving control for the currently attached interchangeable lens 12, for example, the driving amount data (damping data), from the application of the brake to the complete stop, of the lens that is most disadvantageous in the stop control are converted into a pulse count, and the pulse count is used as the value of Q for the present.

Then, at step #215, an event interrupt is permitted, and at step #220, the energization direction is decided based on the focusing movement direction decided at step #115 of the automatic focusing control. Then, at step #225, the energization is activated to start the lens driving control and this routine is ended.

Figure 8:
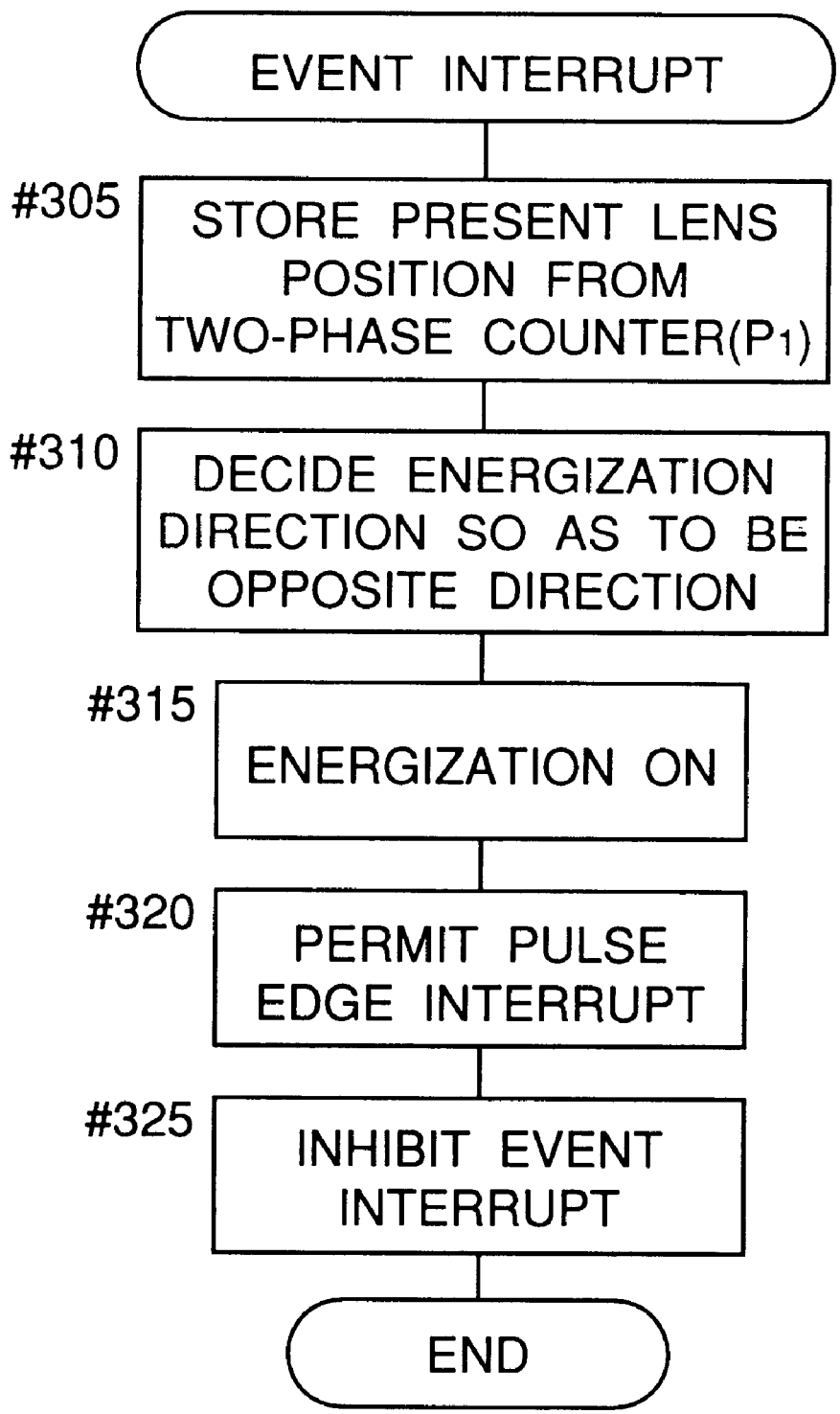
FIG. 8 is a flowchart showing a routine of an event interrupt.

FIG. 8 is a flowchart showing a routine of the event interrupt permitted at step #215 of the lens driving control routine. In the figure, first, at step #305, the first lens position is stored from the two-phase counter of the AF encoder 11, whereby the position where the stop control is started is detected. Here, $P_1$ represents the pulse count from the start of the lens driving control to the detected lens position.

Then, at step #310, the energization direction is decided so that the direction is reversed, that is, the opposite energization is performed. Then, at step #315, the opposite energization is activated. Then, at step #320, a pulse edge interrupt is permitted. This is to monitor the lens movement direction whenever necessary by the two-phase counter. Then, at step #325, the event interrupt is inhibited and this routine is ended.

Figure 9:
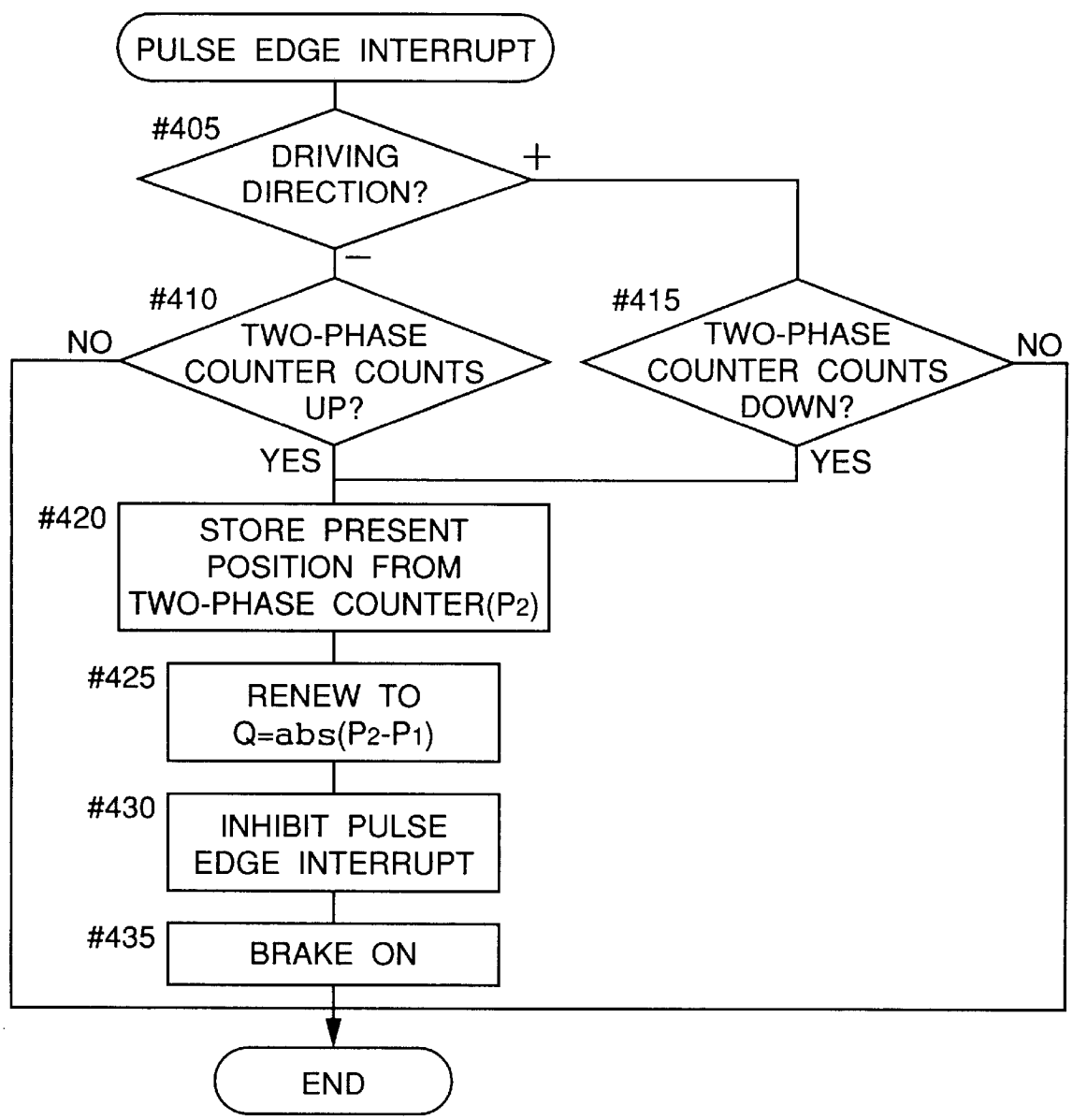
FIG. 9 is a flowchart showing a routine of a pulse edge interrupt.

FIG. 9 is a flowchart showing a routine of the pulse edge interrupt permitted at step #320 of the event interrupt routine. In the figure, first, at step #405, the initial driving direction where the lens driving is started is determined. This is done for determining whether the direction in which the taking lens 13 is moved for focusing (focusing movement direction) is toward the infinity side or toward the near side. Either side may be set as the plus or the minus side. When the initial driving direction is the minus side, the process shifts to step #410. At step #410, it is determined whether the two-phase counter of the AF encoder 11 counts up or not, that is, whether the lens movement direction is reversed or not. When the AF encoder 11 counts up, the process shifts to step #420.

When the initial driving direction is the plus direction at step #405, the process shifts to step #415. At step #415, it is determined whether the two-phase counter of the AF encoder 11 counts down or not, that is, the lens movement direction is reversed or not. When the two-phase counter counts down, the process shifts to step #420. At step #420, the second lens position is stored from the two-phase counter of the AF encoder 11, whereby the position where the lens movement direction is reversed is detected. Here, $P_2$ represents the pulse count from the start of the lens driving control to the detected lens position.

Then, at step #425, the absolute value of $P_2-P_1$ is obtained, the pulse count when the lens is driven from the first lens position to the second lens position in the present driving is calculated, and the value is renewed as the value of Q obtained in the present driving control and is used for the next lens driving control. Here, abs represents the absolute value. Then, at step #430, the pulse edge interrupt is inhibited. Then, at step #435, the brake is activated and this routine is ended.

Figure 10A:
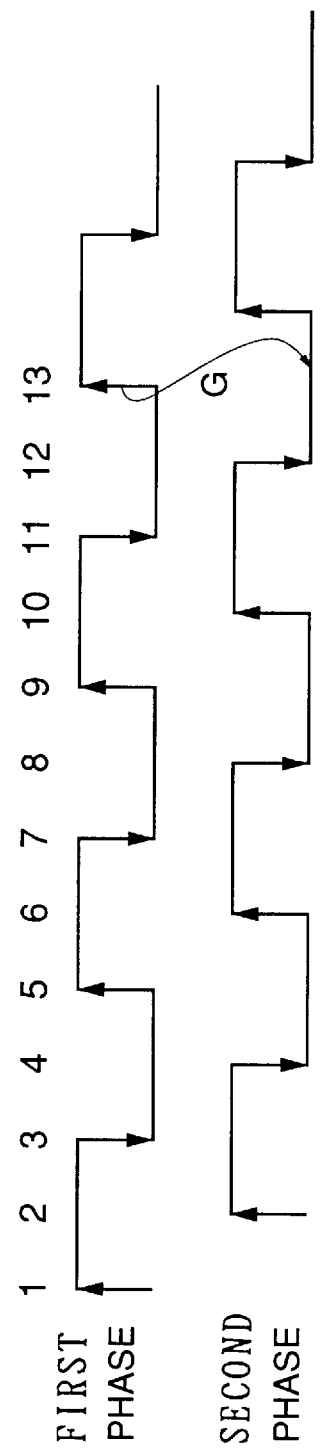
FIGS. 10A and 10B are schematic views of assistance in explaining the working of a two-phase counter of an AF encoder.
Figure 10B:
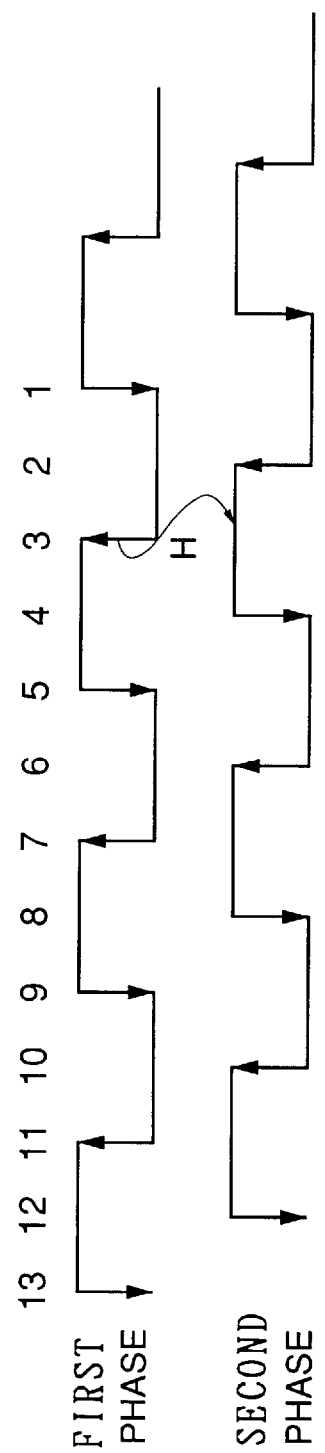

FIGS. 10A and 10B are schematic views of assistance in explaining the working of the two-phase counter of the AF encoder 11. FIG. 10A shows the manners of generation of first-phase and second-phase pulses in a case where the lens movement direction is the plus direction. FIG. 10B shows the manners of generation of first-phase and second-phase pulses in a case where the lens movement direction is the minus direction. The sequences of numbers at the top of the views represent pulse counts. First, as shown in FIG. 10A, the pulses generated with the lens movement in the plus direction are counted from the left, and, for example, at the point of time when the first-phase pulse edge rises at the thirteenth pulse, the second-phase pulse is in the falling or low state as shown by the arrow G.

For example, when it is assumed that the lens movement direction is reversed at the thirteenth pulse, as shown in FIG. 10B, the pulses generated with the lens movement in the minus direction are counted from the right, and, for example, at the point of time when the first-phase pulse edge rises at the third pulse, the second-phase pulse is in the rising or high state as shown by the arrow H. Thus, since the state of one phase when the pulse edge of the other phase occurs differs according to the lens movement direction, by using the two-phase counter, the lens movement direction can be grasped whenever necessary.

Figure 11:
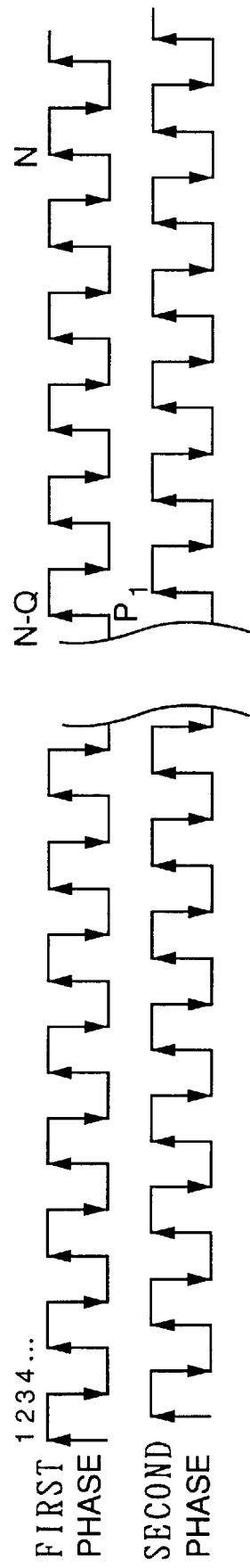
FIG. 11 is a schematic view showing an example of occurrence timing of the event interrupt.

FIG. 11, which is a schematic view showing an example of occurrence timing of the event interrupt, shows the manners of generation of first-phase and second-phase pulses. The sequence of numbers at the top of the view represents pulse counts by the AF encoder 11. As shown in the figure, in a case where the lens driving control is started and the generated pulses are counted from the left, when the target position of the present focusing movement is a position being N pulses ahead, the event interrupt occurs at a position being back from the target position by Q pulses obtained in the previous lens driving control. That is, the event interrupt occurs at a position being N–Q pulses ahead of the lens driving start position, and the position is the first lens position ($P_1$ pulse). Pulses being back from the pulse where the event interrupt occurs are not shown.

FIG. 12 is a schematic view showing an example of occurrence timing of the pulse edge interrupt. As shown in the figure, in the left end of the view, the event interrupt occurs at the N–Q-th pulse from the start of the lens driving, for example, at the point of time when the first-phase pulse edge rises, and from immediately after the first lens position is stored, the pulse edge interrupt is applied every time the first-phase pulse edges and the second-phase pulse edges occur as shown by the arrows I. Thereafter, the interrupt is continued until the lens movement direction is reversed and the second lens position is stored.

Figure 13A:
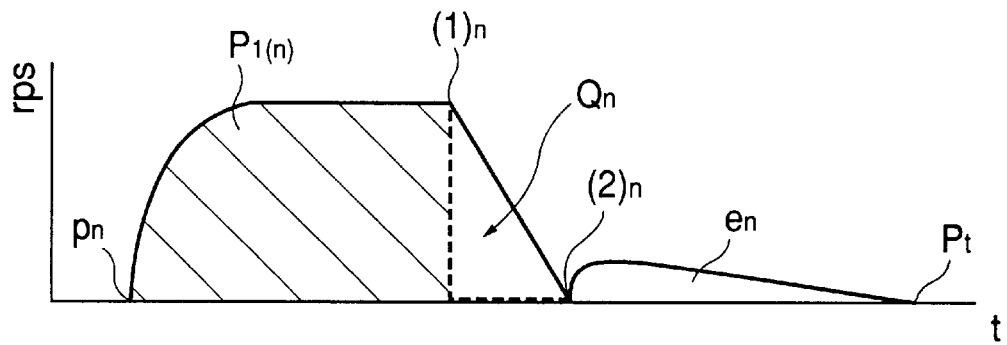
FIGS. 13A to 13C are graphs showing an example of variation of the event interrupt occurrence timing.
Figure 13B:
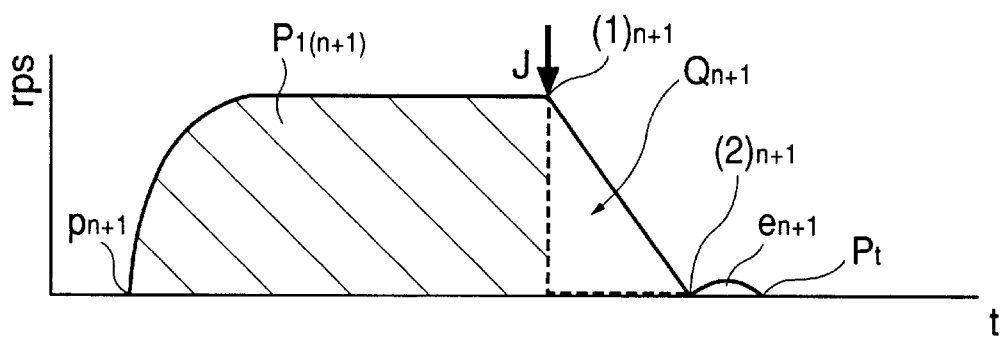
Figure 13C:
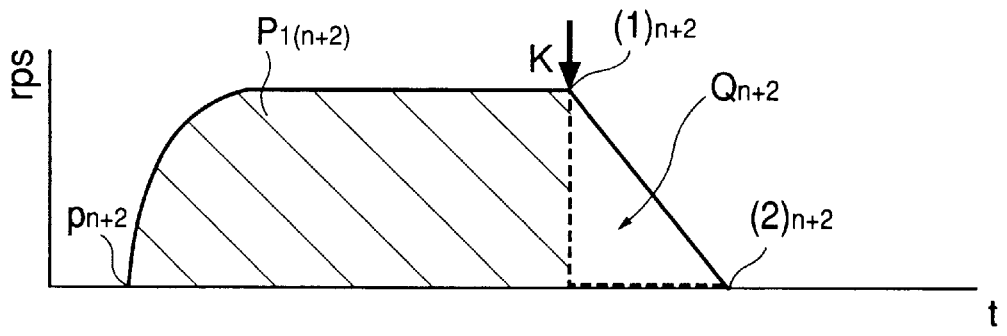

FIGS. 13A to 13C are graphs schematically showing examples of variation of the event interrupt occurrence timing. FIGS. 13A to 13C show manners of the n-th, the n+1-th and the n+2-th (n is an integer) lens driving controls of the currently attached interchangeable lens 12, respectively. The lateral axis represents the drive time t. The longitudinal axis represents the number of revolutions rps of the drive motor which is the AF actuator 10. Here, for simplicity, it is assumed that the number of revolutions of the drive motor corresponds to the pulse count.

First, in the n-th lens driving control, as shown in FIG. 13A, the motor is activated with full energization at a point $p_n$, driving is performed by $P_{1(n)}$ pulses, which is a predetermined driving amount, shown by the hatching, the opposite energization is performed at a point $(1)_n$ which is the first lens position to perform the stop control, and the brake is applied at a point $(2)_n$ which is the second lens position where the lens movement direction starts to be reversed, so that the driving amount error from $N_n$ pulses which are the total driving amount to a point $P_t$ which is the present target position is $e_n$ pulses. The driving amount from the point $p_n$ to the second lens position is $P_{2(n)}$ pulses. The driving amount from the first lens position to the second lens position in this case is $Q_n=\text{abs}(P_{2(n)}-P_{1(n)})$ pulses surrounded by the triangle of the figure.

The predetermined driving amount is given by $P_{1(n)}=N_n-Q_{n-1}$ from the damping characteristic of the lens obtained by the previous lens driving control. When n=1, that is, when the present driving control is the first driving control for the currently attached interchangeable lens 12, there are cases where the driving amount data (damping data), from the application of the brake to the complete stop, of the lens that is most disadvantageous in the stop control are converted into a pulse count and the pulse count is used as the value of $Q_0$ for the present. Therefore, in this case, it can happen that the driving amount error increases as shown in the figures and the control time increases.

In the n+1-th lens driving control, as shown in FIG. 13B, the motor is activated with full energization at a point $P_{n+1}$, driving is performed by a predetermined driving amount shown by the hatching, specifically $P_{1(n+1)}$ pulses, that is, the value obtained by subtracting $Q_n$ pulses which are obtained previously from $N_{n+1}$ pulses which are the total driving amount this time, the event interrupt is applied as shown by the arrow J at a point $(1)_{n+1}$ which is the first lens position, the opposite energization is applied to perform the stop control, and the brake is applied at a point $(2)_{n+1}$ which is the second lens position where the lens movement direction starts to be reversed, so that the driving amount error from the $N_{n+1}$ pulses is $e_{n+1}$. The driving amount from the point $p_{n+1}$ to the second lens position is $P_{2(n+1)}$ pulses. The driving amount from the first lens position to the second lens position in this case is $Q_{n+1}=\text{abs}(P_{2(n+1)}-P_{1(n+1)})$ pulses surrounded by the triangle of the figure.

In the n+2-th lens driving control, as shown in FIG. 13C, the motor is activated with full energization at a point $p_{n+2}$, driving is performed by a predetermined driving amount shown by the hatching, specifically $P_{1(n+2)}$ pulses, that is, the value obtained by subtracting $Q_{n+1}$ pulses which are obtained previously from $N_{n+2}$ pulses which are the total driving amount this time, the event interrupt is applied as shown by the arrow K at a point $(1)_{n+2}$ which is the first lens position, the opposite energization is applied to perform the stop control, and the brake is applied at a point $(2)_{n+2}$ which is the second lens position where the lens movement direction starts to be reversed, so that there is hardly any driving amount error from the $N_{n+2}$ pulses. The driving amount from the point $p_{n+2}$ to the second lens position is $P_{2(n+2)}$ pulses. The driving amount from the first lens position to the second lens position in this case is $Q_{n+2}=\text{abs}(P_{2(n+2)}-P_{1(n+2)})$ pulses surrounded by the triangle of the figure.

This example is illustrated on the assumption that the driving amount error decreases with each lens driving control being performed. However, even in the same lens, the condition of driving control changes according to the condition of photographing operation and is subject to a subtle influence of friction or the like. Therefore, the occurrence of some driving amount error cannot be avoided in each lens driving control. However, it is to be noted that the error is within a sufficiently practical range.

Figure 14:
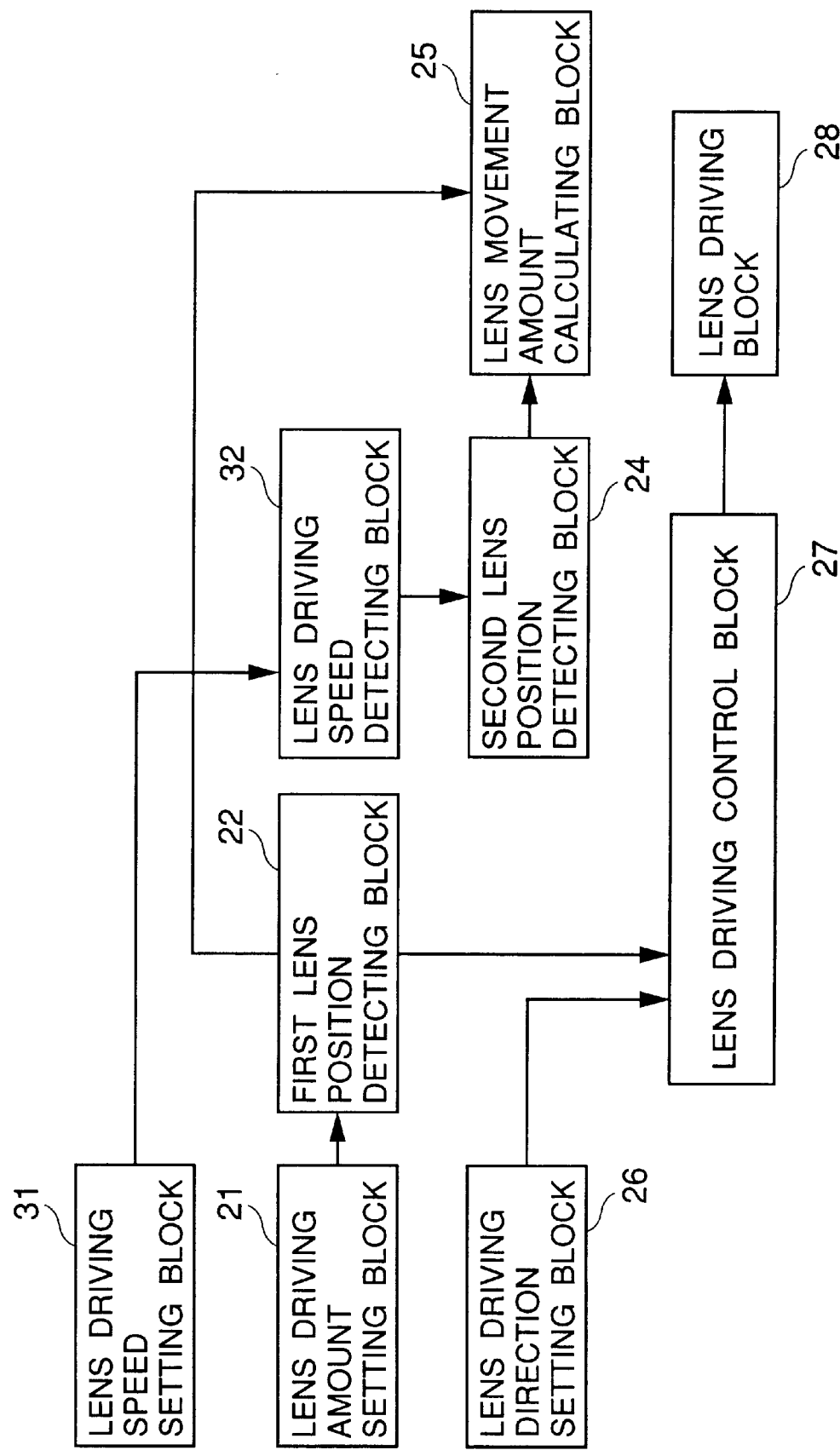
FIG. 14 is a block diagram virtually showing the function of a control system in a second embodiment of the present invention by dividing the function into function units.
Figure 15:
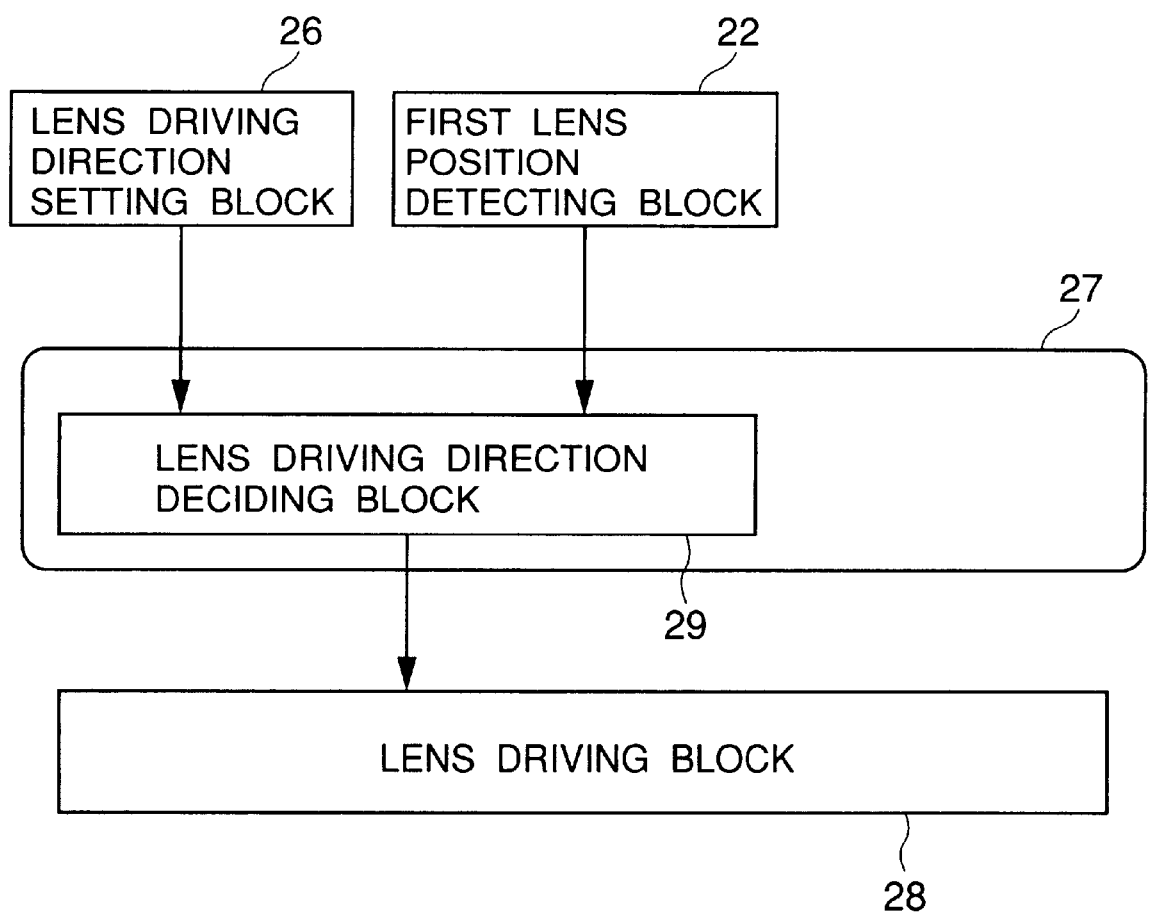
FIG. 15 is a block diagram showing the relationship between the lens driving control block and other blocks.

FIGS. 14 and 15 are block diagrams schematically showing the function of a control system in a second embodiment of the present invention by dividing the function into function units. As shown in FIG. 14, first, receiving in-focus position information from the focus detection element 9, a lens driving amount setting block 21 sets the total driving amount of the taking lens 13. Then, a first lens position detecting block 22 detects the position of the taking lens 13 when the remaining driving amount to the in-focus point becomes a predetermined value. The predetermined value comes from a speed reduction point set based on the damping characteristic of the lens as described later. The information at this time is output to a lens movement amount calculating block 25 and a lens driving control block 27.

A lens driving speed setting block 31 sets a target speed. A lens driving speed detecting block 32 detects the position where the speed of the taking lens 13 becomes the set speed by use of a second lens position detecting block 24, and the position is set as the second lens position. The information at this time is output to the lens movement amount calculating block 25.

A lens driving direction setting block 26 sets the driving direction for directing the taking lens 13 to the in-focus position. This information is output to the lens driving control block 27. Lastly, the lens driving control block 27 controls a lens driving block 28 based on these pieces of information. The lens movement amount calculating block 25 calculates the movement amount from the first lens position to the second lens position. Based on this, the predetermined time for the next driving is decided.

The above-mentioned blocks are described for convenience of explanation and do not necessarily correspond to actual parts. In actuality, a function represented as a single block includes one that is achieved by a plurality of parts operating in conjunction with one another or includes a single part that achieves functions of a plurality of blocks. For example, the workings of the lens driving amount setting block 21, the lens movement amount calculating block 25, the lens driving direction setting block 26, the lens driving control block 27, the lens driving speed setting block 31 and the lens driving speed detecting block 32 include at least part of a function achieved by the CPU 2. The workings of the first lens position detecting block 22 and the second lens position detecting block 24 include a function achieved by the AF encoder 11. The working of the lens driving block 28 includes functions achieved by the AF actuator 10 and the lens driving system 15.

As shown in FIG. 15, the lens driving control block 27 and other control blocks are functionally connected therebetween. A lens driving direction deciding block 29 provided in the lens driving control block 27 shown in the figure decides the driving direction of the taking lens 13 so as to be the in-focus direction based on the output of the lens driving direction setting block 26 at the start of the driving, and when the output of the first lens position detecting block 22 comes, the lens driving direction deciding block 29 decides the driving direction so as to be opposite to the direction having been decided (opposite energization). The lens driving block 28 is controlled based on these pieces of information.

The blocks of FIG. 15 are also described for convenience of explanation and do not necessarily correspond to actual parts.

A concrete control in this embodiment will hereinafter be described with reference to flowcharts. The flowcharts showing a routine of automatic focusing control and a routine of lens driving are similar to those in FIGS. 6 and 7 shown in the first embodiment. However, N–Q in FIG. 7 is replaced by N–(Q+R). R will be described later.

Figure 16:
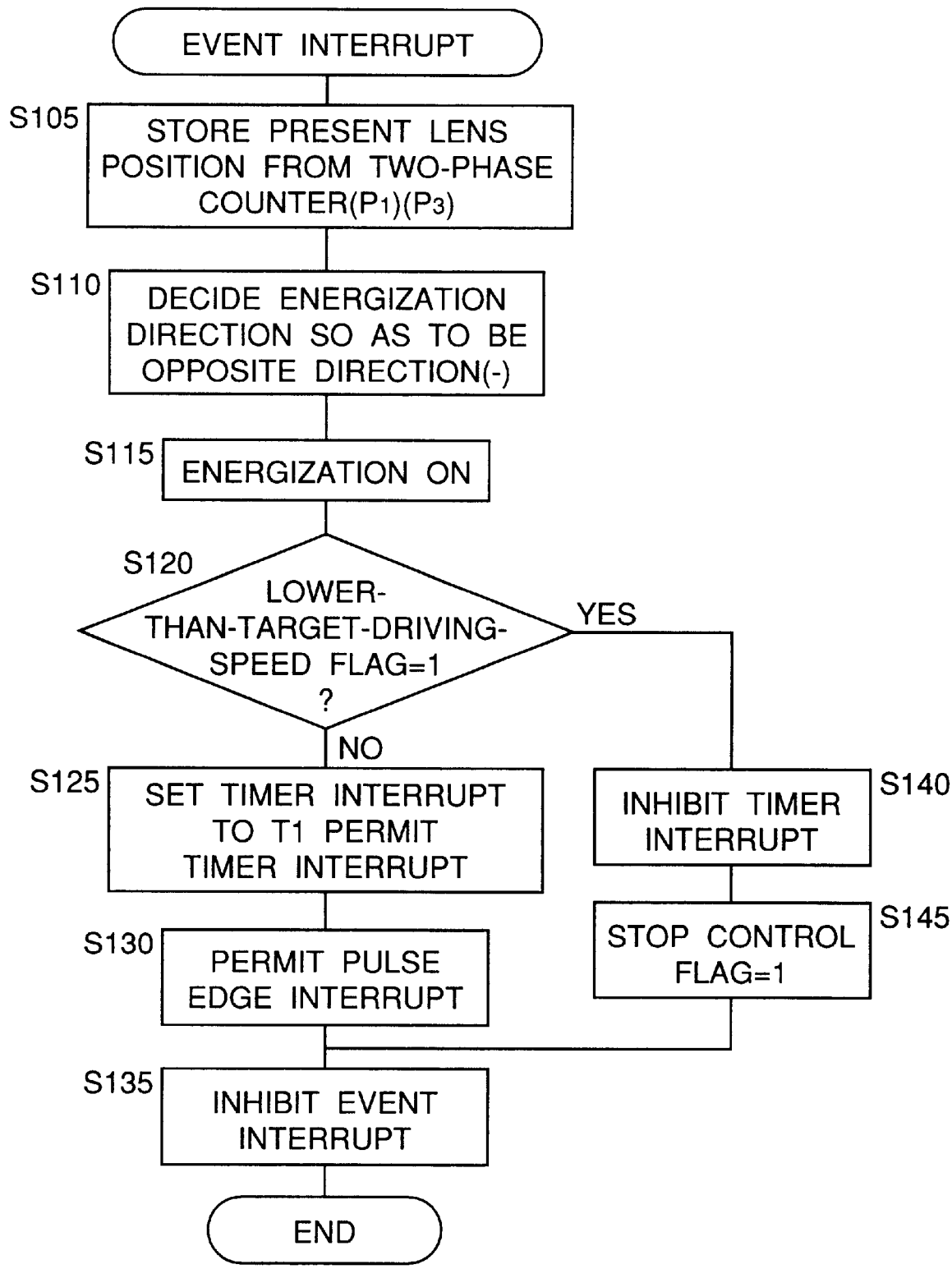
FIG. 16 is a flowchart showing a routine of the event interrupt.

FIG. 16 is a flowchart showing a routine of the event interrupt permitted at step #215 of the lens driving control routine shown in FIG. 7. In the figure, first, at step S105, the first lens position is stored from the two-phase counter of the AF encoder 11, whereby the position where the stop control is started is detected. Here, $P_1$ represents the pulse count from the start of the lens driving control to the detected lens position.

Then, at step S110, the energization direction is decided so that the direction is reversed, that is, the opposite energization is performed. Then, at step S115, the opposite energization is activated. Then, at step S120, it is determined whether a lower-than-target-driving-speed flag (described later) is set or not. Since this flag is not set at first, the process shifts to step S125 in this case. At step S125, a timer interrupt time is set to T1 and a timer interrupt is permitted.

Here, T1 is the pulse interval time corresponding to the target speed set by the lens driving speed setting block 31. Details will be given later. Then, at step S130, the pulse edge interrupt is permitted. This is to monitor the lens movement speed whenever necessary by the two-phase counter like in the first embodiment. Then, at step S135, the event interrupt is inhibited and this routine is ended.

Figure 17:
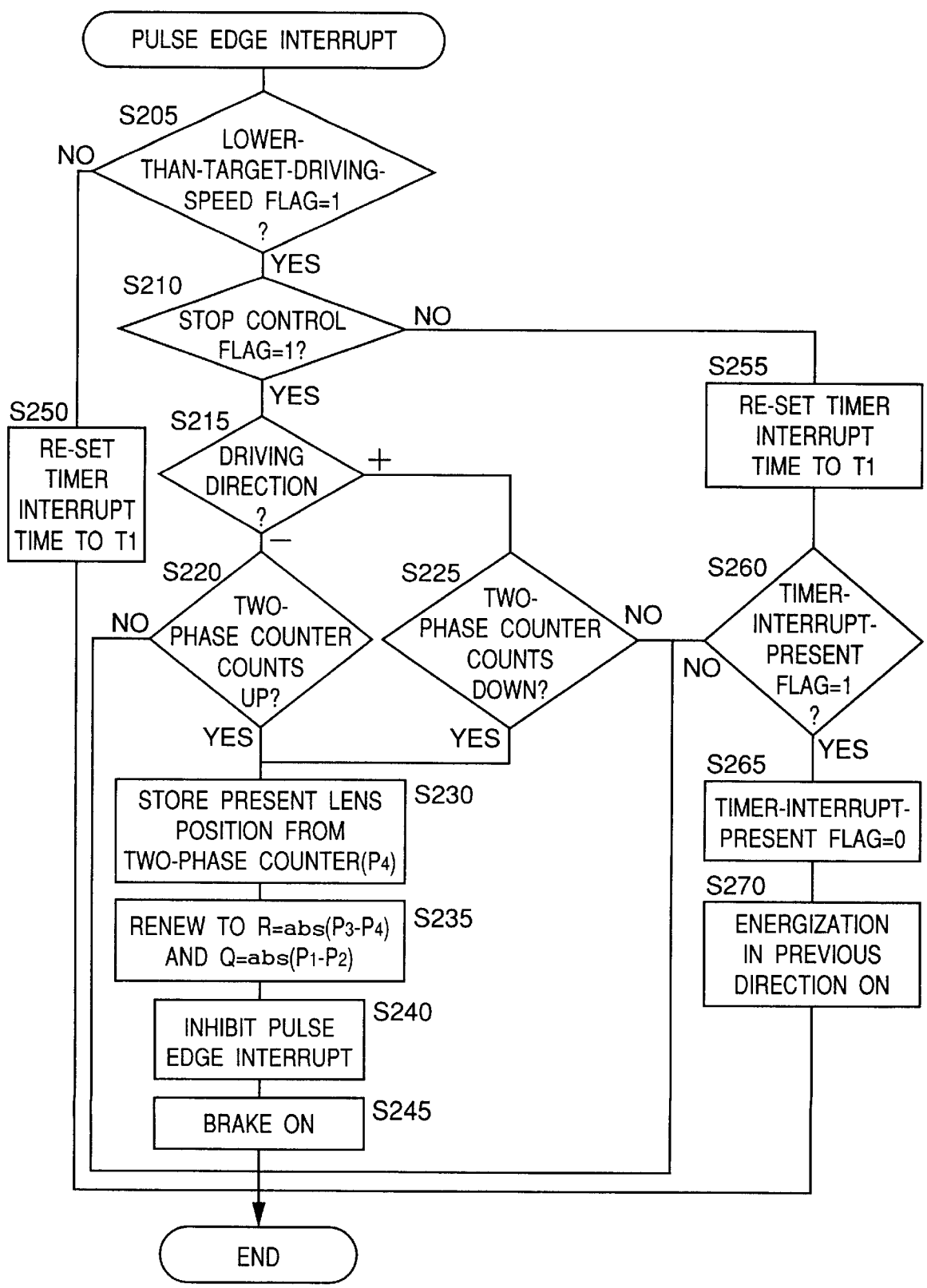
FIG. 17 is a flowchart showing a routine of the pulse edge interrupt.

FIG. 17 is a flowchart showing a routine of the pulse edge interrupt permitted at step S130 of the event interrupt routine. In the figure, at step S205, it is determined whether the lower-than-target-driving-speed flag is set or not. Since this flag is not set at first, the process shifts to step S250 in this case. At step S250, the timer interrupt time is re-set to T1 and this routine is ended. Consequently, the timer interrupt does not occur until the driving speed becomes equal to or lower than the target driving speed corresponding to T1.

When it is determined at step S205 that the lower-than-target-driving-speed flag is set, the process shifts to step S210. At step S210, it is determined whether a stop control flag is set or not. Since this flag is not set at first, the process shifts to step S255 in this case. Then, at step S260, it is determined whether a timer-interrupt-present flag is set or not. Since this flag is not set at first, this routine is ended in this case.

Figure 18:
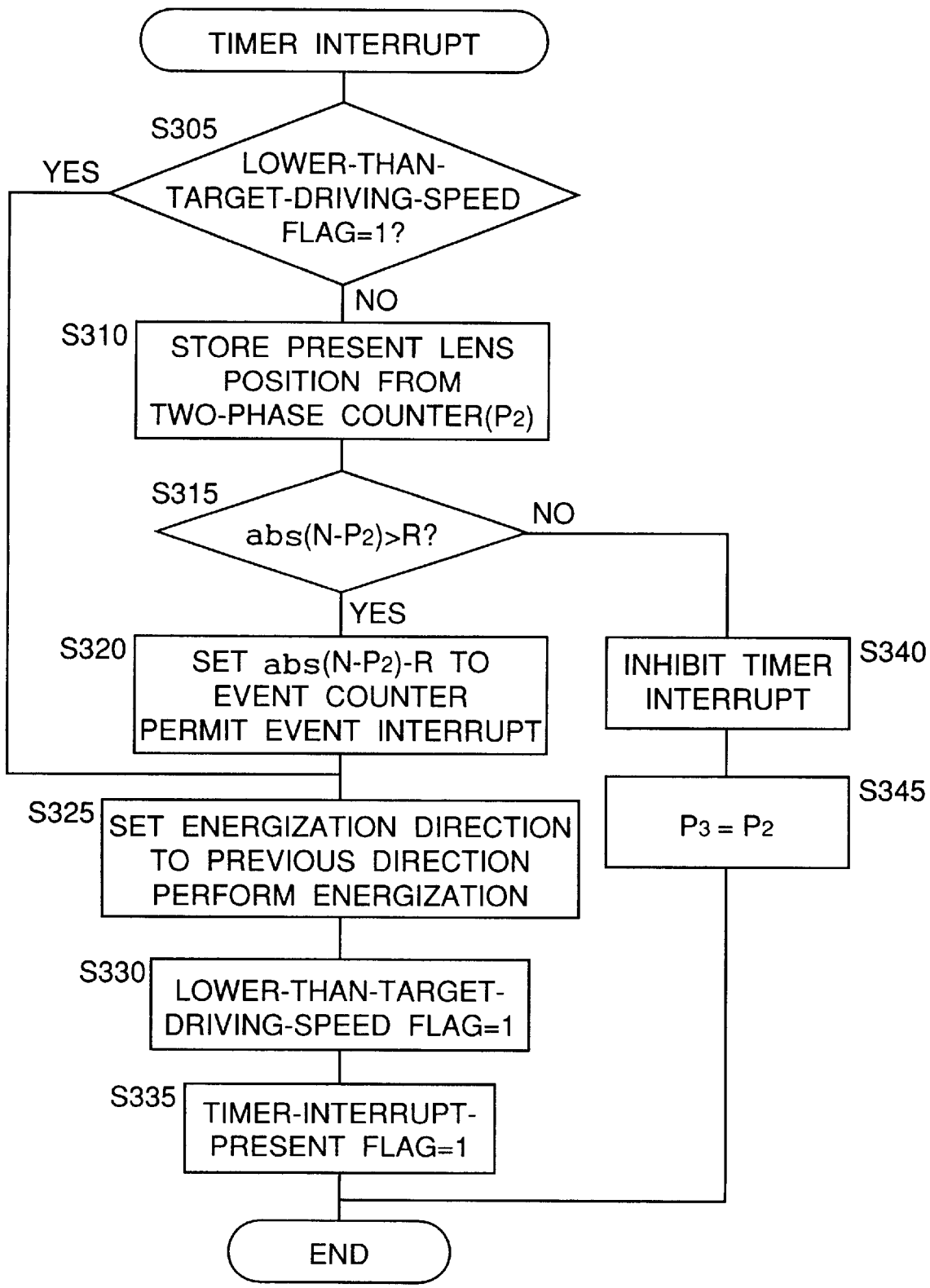
FIG. 18 is a flowchart showing a routine of a timer interrupt.

FIG. 18 is a flowchart showing a routine of the timer interrupt permitted at step S125 of the event interrupt routine. In the figure, when the driving speed becomes equal to or lower than the target driving speed corresponding to T1 and the timer interrupt occurs, at step S305, it is determined whether the lower-than-target-driving-speed flag is set or not. Since this flag is not set at first, the process shifts to step S310. At step S310, the second lens position is stored from the two-phase counter of the AF encoder 11, whereby the lens position where the target driving speed is reached is detected. Here, $P_2$ represents the pulse count from the start of the lens driving control to the detected lens position.

Then, at step S315, it is determined whether the absolute value of $N-P_2$ is higher than R or not. When it is higher, the process shifts to step S320. Here, N represents the total driving pulse count of the target lens position which is the in-focus point like in the first embodiment, and R represents the pulse count from the opposite energization at the time of the occurrence of the event interrupt after the timer interrupt occurs, to the stop which pulse count is obtained in the previous lens driving control. Here, abs represents the absolute value. Details will be given later.

At step S320, abs($N-P_2$)-R is set to the event counter to permit the event interrupt. Consequently, the event interrupt occurs after abs($N-P_2$)-R pulses from the first timer interrupt. Then, at step S325, the energization direction is set to the previous direction and energization is performed. Then, at step S330, the lower-than-target-driving-speed flag is set. Then, at step S335, the timer-interrupt-present flag is set and this routine is ended.

In the succeeding pulse edge interrupt, at step S205 of FIG. 17, it is determined whether the lower-than-target-driving-speed flag is set or not. Since this flag is set here, the process shifts to step S210. At step S210, it is determined whether the stop control flag is set or not. When the flag has not been set yet, the process shifts to step S255. At step S255, the timer interrupt time is re-set to T1.

Then, at step S260, it is determined whether the timer-interrupt-present flag is set or not. Since this flag is set here, the process shifts to step S265. At step S265, the timer-interrupt-present flag is cleared. Then, at step S270, the energization in the previous direction is activated and this routine is ended. Consequently, energization is performed in the previous direction when the driving speed is equal to or lower than the target driving speed and energization is stopped when the target driving speed is exceeded, whereby control to maintain the target driving speed is performed.

In the succeeding timer interrupt, at step S305 of FIG. 18, it is determined whether the lower-than-target-driving-speed flag is set or not. Since this flag has already been set here, the process jumps to step S325. Until the succeeding event interrupt occurs, the pulse edge interrupt and the timer interrupt are repeated in the above-described manners while the target driving speed is being monitored.

When the event interrupt after the occurrence of the timer interrupt occurs, in FIG. 16, first, at step S105, a third lens position is stored from the two-phase counter of the AF encoder 11 ($P_3$), whereby the lens position at the time of the occurrence of the event interrupt after the occurrence of the timer interrupt is detected. Here, $P_3$ represents the pulse count from the start of the lens driving control to the detected lens position.

Then, at step S110, the energization direction is decided so that the direction is reversed, that is, the opposite energization is performed. Then, at step S115, the opposite energization is activated. Then, at step S120, it is determined whether the lower-than-target-driving-speed flag (described later) is set or not. Since this flag has already been set, the process shifts to step S140 in this case. At step S140, the timer interrupt is inhibited. Then, at step S145, the stop control flag is set. Then, at step S135, the event interrupt is inhibited and this routine is ended.

At this time, in the pulse edge interrupt routine shown in FIG. 17, at step S205, it is determined whether the lower-than-target-driving-speed flag is set or not. Since this flag has already been set here, the process shifts to step S210 in this case. At step S210, it is determined whether the stop control flag is set or not. Since this flag has already been set here, the process shifts to step S215 in this case.

At step S215, the initial driving direction where the lens driving is started is determined. This is done for determining whether the direction in which the taking lens 13 is moved for focusing (focusing movement direction) is toward the infinity side or toward the near side. Either side may be set as the plus or the minus side. Here, when the initial driving direction is the minus side, the process shifts to step S220. At step S220, it is determined whether the two-phase counter of the AF encoder 11 counts up or not, that is, whether the lens movement direction is reversed or not. When the AF encoder 11 counts up, the process shifts to step S230.

When the initial driving direction is the plus direction at step S215, the process shifts to step S225. At step S225, it is determined whether the two-phase counter of the AF encoder 11 counts down or not, that is, the lens movement direction is reversed or not. When the two-phase counter counts down, the process shifts to step S230. At step S230, a fourth lens position is stored from the two-phase counter of the AF encoder 11, whereby the position where the lens movement direction is reversed is detected. Here, $P_4$ represents the pulse count from the start of the lens driving control to the detected lens position.

Then, at step S235, the absolute value of $P_1-P_2$ is obtained, the pulse count when the lens is driven from the first lens position to the second lens position in the present driving is calculated, the value is renewed as the value of Q obtained in the present driving control, the absolute value of $P_3-P_4$ is obtained, the pulse count when the lens is driven from the third lens position to the fourth lens position in the present driving is calculated, and the value is renewed as the value of R obtained in the present driving control and is used for the next lens driving control. Here, abs represents the absolute value. Then, at step S240, the pulse edge interrupt is inhibited. Then, at step S245, the brake is activated and this routine is ended.

In the timer interrupt shown in FIG. 18, at step S315, it is determined whether the absolute value of $N-P_2$ is higher than R or not. When it is not higher, the process shifts to step S340. At step S340, the timer interrupt is inhibited. Then, at step S345, $P_3$ is replaced by $P_2$ and this routine is ended. In this case, the event interrupt after the timer interrupt does not occur, and the stop control is performed at a stretch.

Figure 19:
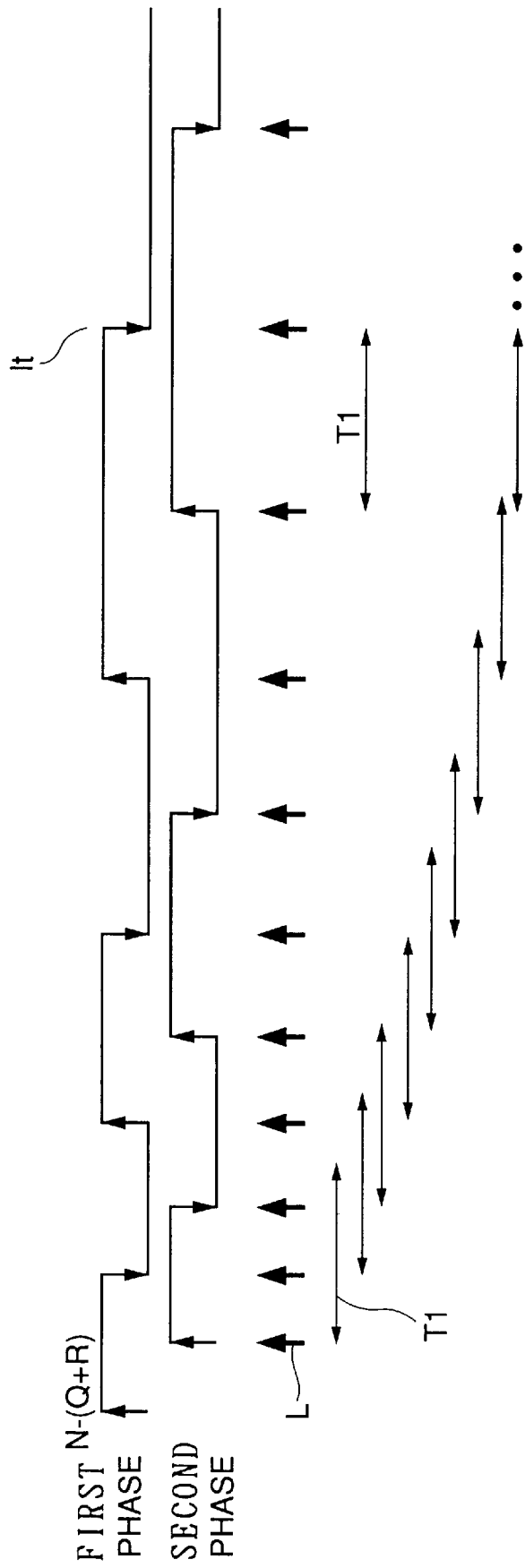
FIG. 19 is a schematic view showing an example of occurrence timing of the pulse edge interrupt and the timer interrupt.

FIG. 19 is a schematic view showing an example of occurrence timing of the pulse edge interrupt and the timer interrupt. As shown in the figure, in the left end of the view, the event interrupt occurs at the N−(Q+R)-th pulse from the start of the lens driving, for example, at the point of time when the first-phase pulse edge rises, and from immediately after the first lens position is stored, the pulse edge interrupt is applied every time the first-phase pulse edges and the second-phase pulse edges occur as shown by the arrows L. Then, every time the pulse edge interrupt occurs, the timer interrupt time is all set to the pulse interval time T1 corresponding to the target driving speed. Then, the lens movement speed gradually decreases by the stop control in the event interrupt, and the timer interrupt occurs at the point of time $I_t$ when the pulse interval exceeds T1.

Figure 20:
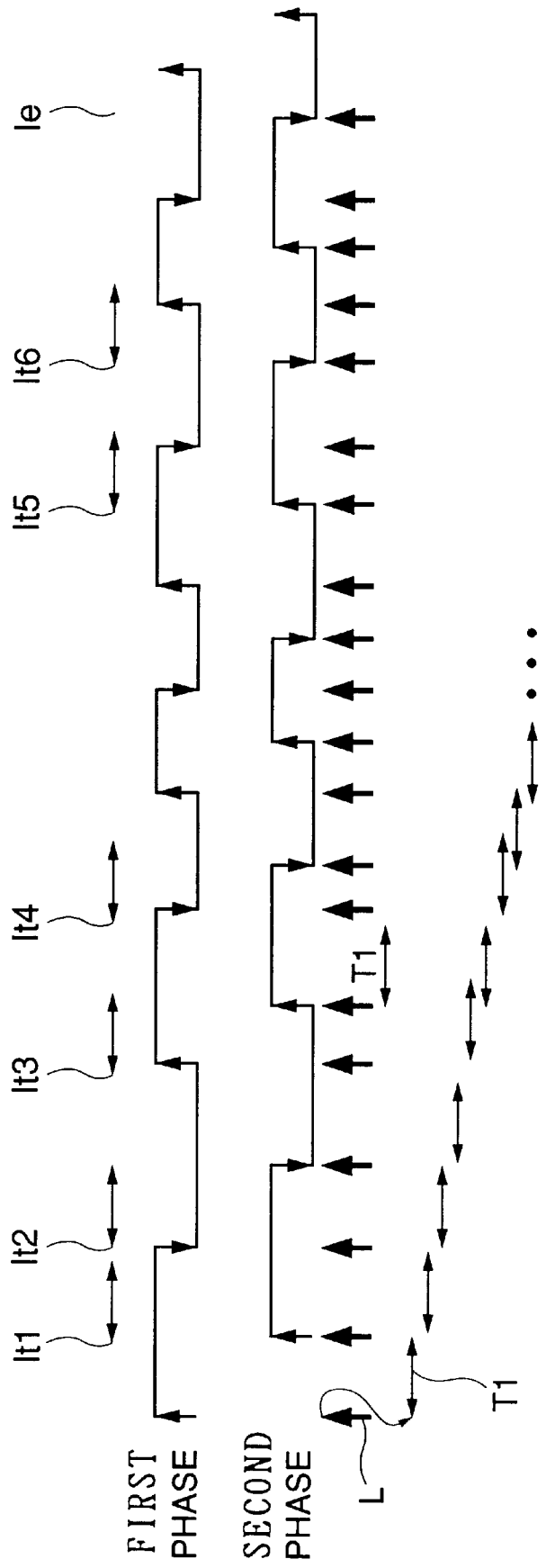
FIG. 20 is a schematic view showing an example of occurrence timing of the event interrupt after the occurrence of the timer interrupt.

FIG. 20 is a schematic view showing an example of occurrence timing of the event interrupt after the occurrence of the timer interrupt. As shown by the arrows L in the figure, it is continued to perform the pulse edge interrupt every occurrence of the one-phase pulse edges and the two-phase pulse edges and to set the timer interrupt time to T1 every occurrence of the pulse edge interrupt. In FIG. 20, when the first timer interrupt occurs, in order to maintain the target driving speed, the energization direction is returned to the previous direction and energization is performed as shown at step S325 of FIG. 18.

When the target driving speed is exceeded, the energization is stopped. Then, the lens movement speed is reduced again, and the timer interrupt occurs at the point of time It1 when the pulse interval exceeds T1. The timer interrupt for maintaining the target speed is repeated thereafter in this manner, and after abs(N−P$_2$)-R pulses from the first timer interrupt (the point of time Ie), the event interrupt occurs. In FIG. 20, an example in which the timer interrupt is repeated six times as indicated by It1 to It6 is shown.

Figure 21A:
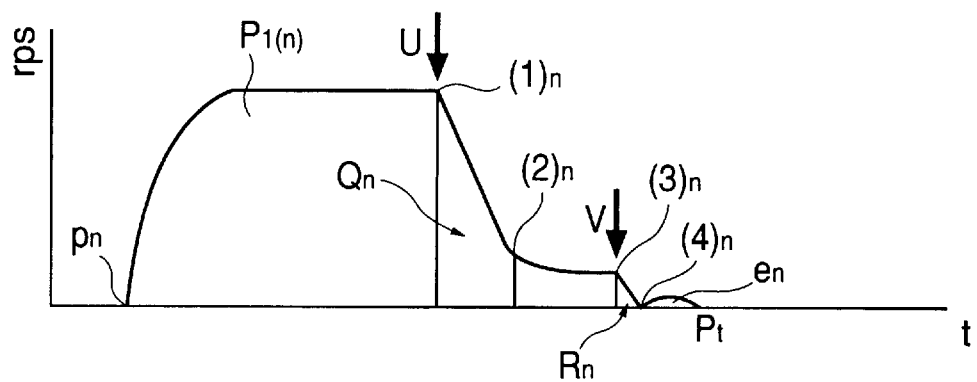
FIGS. 21A and 21B are graphs showing an example of variation of the event interrupt occurrence timing.
Figure 21B:
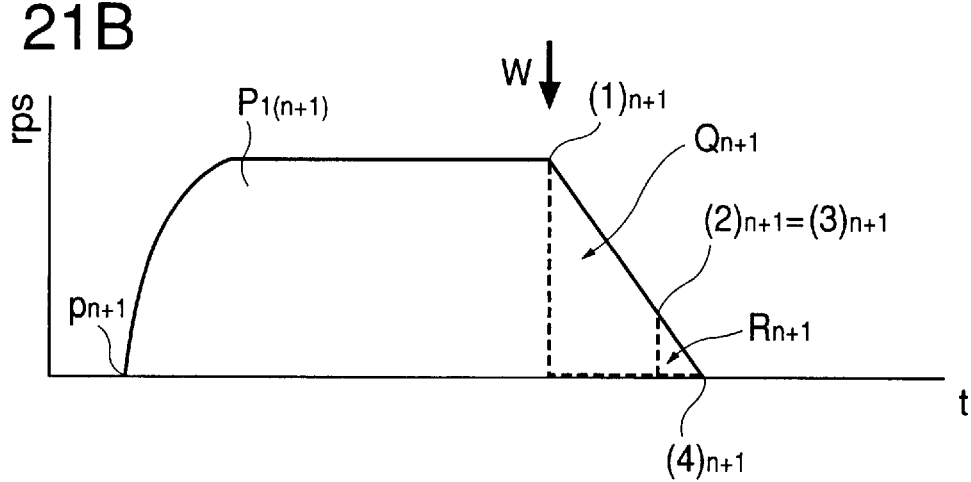

FIGS. 21A and 21B are graphs schematically showing examples of variation of the event interrupt occurrence timing. FIGS. 21A and 21B show manners of the n-th and the n+1-th (n is an integer) lens driving controls of the currently attached interchangeable lens 12. The lateral axis represents the drive time t. The longitudinal axis represents the number of revolutions rps of the drive motor which is the AF actuator 10. Here, for simplicity, it is assumed that the number of revolutions of the drive motor corresponds to the pulse count.

First, in the n-th lens driving control, as shown in FIG. 21A, the motor is activated with full energization at the point $p_n$, driving is performed by $P_{1(n)}$ pulses which is a predetermined driving amount, the event interrupt is applied as shown by the arrow U at the point $(1)_n$ which is the first lens position, the opposite energization is applied to perform the stop control, and the first timer interrupt occurs at the point $(2)_n$ which is the second lens position, immediately after the lens movement speed becomes equal to or lower than the target driving speed. The driving amount from the point $p_n$ to this position is $P_{2(n)}$ pulses. The driving amount from the first lens position to the second lens position in this case is Qn=abs($P_{1(n)}$−$P_{2(n)}$) pulses surrounded by the trapezoid of the figure.

Thereafter, the target driving speed is maintained while the timer interrupt is applied as required, driving is performed by $P_{3(n)}$ pulses which is another predetermined driving amount from the point $p_n$, the event interrupt is applied as shown by the arrow V at a point $(3)_n$ which is the third lens position, the opposite energization is applied to perform the stop control, and the brake is applied at a point $(4)_n$ which is the fourth lens position where the lens movement direction starts to be reversed, so that the driving amount error from $N_n$ pulses which are the total driving amount to the point $P_t$ which is the present target position is $e_n$ pulses. The driving amount from the point $p_n$ to the fourth lens position is $P_{4(n)}$ pulses. The driving amount from the third lens position to the fourth lens position in this case is $R_n$=abs($P_{3(n)}$−$P_{4(n)}$) pulses surrounded by the triangle of the figure.

$P_{1(n)}$ pulses which are the predetermined driving amount are given by $P_{1(n)}$=$N_n$−($Q_{n-1}$+$R_{n-1}$) from the damping characteristic of the lens obtained by the previous lens driving control. When n=1, that is, when the present driving control is the first driving control for the currently attached interchangeable lens 12, there are cases where the driving amount data (damping data), from the application of the brake to the complete stop, of the lens that is most disadvantageous in the stop control are converted into a pulse count and the pulse count is used as the values of $Q_0$ and $R_0$ for the present.

The driving amount from the second lens position, that is, the position where the first timer interrupt occurs to the third lens position, that is, the position where the succeeding event interrupt occurs is abs($N_n$−$P_{2(n)}$)−$R_{n-1}$ pulses, and this is the same. Therefore, in these cases, it can happen that the driving amount error increases as shown in the figures and the control time increases.

In the n+1-th lens driving control, as shown in FIG. 21B, the motor is activated with full energization at the point $p_{n+1}$, driving is performed by a predetermined driving amount, specifically $P_{1(n+1)}$ pulses, that is, the value obtained by subtracting $Q_n$+$R_n$ pulses which are obtained previously from $N_{n+1}$ pulses which are the total driving amount this time, the event interrupt is applied as shown by the arrow W at the point $(1)_{n+1}$ which is the first lens position, the opposite energization is applied to perform the stop control, and the first timer interrupt occurs at the point $(2)_{n+2}$ which is the second lens position immediately after the lens movement speed becomes equal to or lower than the target driving speed. The driving amount from the point $p_{n+1}$ to this position is $P_{2(n+1)}$ pulses. The driving amount from the first lens position to the second lens position in this case is $Q_{n+1}$=abs($P_{1(n+1)}$−$P_{2(n+1)}$) pulses surrounded by the trapezoid of the figure.

Thereafter, as shown in the timer interrupt routine of FIG. 18, the timer interrupt is inhibited when the absolute value of N−$P_2$ is not higher than R, and $P_3$ is replaced by $P_2$. Therefore, in this case, the event interrupt after the occurrence of the timer interrupt does not occur and the stop control is performed in a stretch. That is, the stop control is performed by applying the opposite energization at a point $(3)_{n+1}$, which is the third lens position, replaced by the point $(2)_{n+1}$ which is the second lens position, and the brake is applied at a point $(4)_{n+1}$ which is the fourth lens position where the lens movement direction starts to be reversed, so that there is hardly any driving amount error from $N_{n+1}$ pulses which are the total driving amount to the point $P_t$ which is the present target position. The driving amounts from the point $p_{n+1}$ to the third and the fourth lens positions are $P_{3(n+1)}$ pulses and $P_{4(n+1)}$ pulses, respectively. The driving amount from the third lens position to the fourth lens position in this case is $R_{n+1}$=abs($P_{3(n+1)}$−$P_{4(n+1)}$) pulses surrounded by the triangle of the figure.

This example is illustrated on the assumption that the driving amount error decreases with each lens driving control being performed. However, even in the same lens, the condition of driving control changes according to the contents of photographing and is subject to a subtle influence of friction or the like. Therefore, the occurrence of some driving amount error cannot be avoided in each lens driving control. However, it is to be noted that the error is within a sufficiently practical range.

Obviously, many modifications and variations of the present invention are possible in light of the above teachings. It is therefore to be understood that within the scope of the appended claims, the invention may be practiced other than as specifically described.

What is claimed is:

1. A lens driving controller comprising:

a driving mechanism for driving a lens along an optical axis;

a calculator for obtaining a lens driving amount to an in-focus position; and a detector for detecting a position of the lens, wherein the following lens driving control is performed under control of a predetermined controller:

(1) the lens is driven in an in-focus direction in accordance with a lens driving amount obtained by the calculator;

(2) the lens is driven in an opposite direction when the lens reaches a first lens position where a remaining driving amount to the in-focus position is a predetermined value;

(3) information on a second lens position when the lens actually starts to move in the opposite direction is obtained;

(4) a lens movement amount is obtained from the first lens position and the second lens position; and (5) remaining driving to the in-focus position and stop control are performed based on an obtained lens movement amount.

2. A lens driving controller as claimed in claim 1, wherein said predetermined value is decided from reference lens damping data in initial lens driving, and is decided based on said obtained lens movement amount in subsequent driving.

3. A lens driving controller as claimed in claim 1, wherein said calculator is included in said controller, and performs calculation based on an output from an element for detecting an in-focus condition of the lens.

4. A lens driving controller as claimed in claim 1, wherein said driving mechanism includes a motor.

5. A lens driving controller as claimed in claim 4, wherein said detector includes an encoder for detecting a driving amount of the motor.

6. A lens driving controller comprising:

a driving mechanism for driving a lens along an optical axis;

a calculator for obtaining a lens driving amount to an in-focus position;

a position detector for detecting a position of the lens; and a speed detector for detecting a driving speed of the lens, wherein the following lens driving control is performed under control of a predetermined controller:

(1) the lens is driven in an in-focus direction in accordance with a lens driving amount decided by the calculator;

(2) the lens is driven in an opposite direction when the lens reaches a first lens position where a remaining driving amount to the in-focus position is a predetermined value;

(3) a second lens position when the driving speed of the lens reaches a predetermined speed after the lens is driven in the opposite direction is detected;

(4) a lens movement amount is calculated from the first lens position and the second lens position; and (5) remaining driving to the in-focus position and stop control are performed based on a calculated lens movement amount.

7. A lens driving controller as claimed in claim 6, wherein said predetermined value is decided from reference lens damping data in initial lens driving, and is decided based on said calculation result in subsequent driving.

8. A lens driving controller as claimed in claim 6, wherein said calculator is included in said controller, and performs calculation based on an output from an element for detecting an in-focus condition of the lens.

9. A lens driving controller as claimed in claim 6, wherein said driving mechanism includes a motor.

10. A lens driving controller as claimed in claim 9, wherein said position detector includes an encoder for detecting a driving amount of the motor.

11. A lens driving controller as claimed in claim 9, wherein said speed detector includes an encoder for detecting a driving amount of the motor.

12. A camera comprising:

a driving mechanism for driving a lens along an optical axis;

a calculator for obtaining a lens driving amount to an in-focus position;

a detector for detecting a position of the lens; and a controller for performing the following lens driving control:

(1) the lens is driven in an in-focus direction in accordance with a lens driving amount obtained by the calculator;

(2) the lens is driven in an opposite direction when the lens reaches a first lens position where a remaining driving amount to the in-focus position is a predetermined value;

(3) information on a second lens position when the lens actually starts to move in the opposite direction is obtained;

(4) a lens movement amount is obtained from the first lens position and the second lens position; and (5) remaining driving to the in-focus position and stop control are performed based on an obtained lens movement amount.

13. A camera as claimed in claim 12, wherein said predetermined value is decided from reference lens damping data in initial lens driving, and is decided based on said obtained lens movement amount in subsequent driving.

14. A camera as claimed in claim 12, wherein said calculator is included in said controller, and performs calculation based on an output from an element for detecting an in-focus condition of the lens.

15. A camera as claimed in claim 12, wherein said driving mechanism includes a motor.

16. A camera as claimed in claim 15, wherein said detector includes an encoder for detecting a driving amount of the motor.

17. A camera comprising:

a driving mechanism for driving a lens along an optical axis;

a calculator for obtaining a lens driving amount to an in-focus position;

a position detector for detecting a position of the lens;

a speed detector for detecting a driving speed of the lens; and a controller for performing the following lens driving control:
- (1) the lens is driven in an in-focus direction in accordance with a lens driving amount obtained by the calculator;
- (2) the lens is driven in an opposite direction when the lens reaches a first lens position where a remaining driving amount to the in-focus position is a predetermined value;
- (3) a second lens position when the driving speed of the lens reaches a predetermined speed after the lens is driven in the opposite direction is detected;
- (4) a lens movement amount is calculated from the first lens position and the second lens position; and
- (5) remaining driving to the in-focus position and stop control are performed based on a calculated lens movement amount.

18. A camera as claimed in claim 17, wherein said predetermined value is decided from reference lens damping data in initial lens driving, and is decided based on said calculation result in subsequent driving.

19. A camera as claimed in claim 17, wherein said calculator is included in said controller, and performs calculation based on an output from an element for detecting an in-focus condition of the lens.

20. A camera as claimed in claim 17, wherein said driving mechanism includes a motor.

21. A camera as claimed in claim 20, wherein said position detector includes an encoder for detecting a driving amount of the motor.

22. A camera as claimed in claim 20, wherein said speed detector includes an encoder for detecting a driving amount of the motor.

* * * * *